(12) United States Patent
Kubotera et al.

(10) Patent No.: US 7,423,422 B2
(45) Date of Patent: Sep. 9, 2008

(54) METAL DETECTOR

(75) Inventors: Shigeru Kubotera, Atsugi (JP); Toshihiko Nagaoka, Atsugi (JP); Satoshi Mitani, Atsugi (JP)

(73) Assignee: Anritsu Industrial Solutions Co., Ltd., Atsugi-Shi, Kanagawa-Ken (JP)

( * ) Notice: Subject to any disclaimer, the term of this patent is extended or adjusted under 35 U.S.C. 154(b) by 0 days.

(21) Appl. No.: 10/548,629

(22) PCT Filed: Mar. 5, 2004

(86) PCT No.: PCT/JP2004/002838

§ 371 (c)(1),
(2), (4) Date: Jun. 12, 2006

(87) PCT Pub. No.: WO2004/086095

PCT Pub. Date: Oct. 7, 2004

(65) Prior Publication Data

US 2006/0226833 A1    Oct. 12, 2006

(30) Foreign Application Priority Data

Mar. 12, 2003  (JP) .............................. 2003-066569

(51) Int. Cl.
*G01N 27/72* (2006.01)
*G01V 3/08* (2006.01)
(52) U.S. Cl. ....................... 324/228; 324/326
(58) Field of Classification Search ................. 324/240, 324/233, 334, 326, 228, 329, 345, 236, 207.16, 324/207.26; 340/551
See application file for complete search history.

(56) References Cited

U.S. PATENT DOCUMENTS 6,812,707 B2 *  11/2004  Yonezawa et al. ........... 324/326

FOREIGN PATENT DOCUMENTS

| JP | 2-36390 |  | 2/1990 |
| JP | 3-123285 |  | 12/1991 |
| JP | 7-260943 | A | 10/1995 |
| JP | 9-304546 | A | 11/1997 |
| JP | 2001-13260 | A | 1/2001 |
| JP | 2001-91663 | A | 4/2001 |

* cited by examiner

*Primary Examiner*—Reena Aurora
(74) *Attorney, Agent, or Firm*—Manubu Kanesaka

(57) ABSTRACT

A memory (33) is provided for storing in advance data of signals supplied from a detector unit (26) when a plurality of metallic foreign matter samples differing in magnitude passes an alternating field, and data representing the magnitude of each foreign matter sample. A setting device (32) causes an indicator 36 to display the magnitude of metal detectable by a determination device (31) on the basis of those data on the foreign matter samples. Further, a contained metal displaying device (34), when the determination device (31) has determined that metallic foreign matter is contained in the object of inspection, displays the magnitude of that metal content on the indicator (36). The user can intuitively grasp the detectable magnitude of metal and the magnitude of the metal contained in the object of inspection.

6 Claims, 19 Drawing Sheets

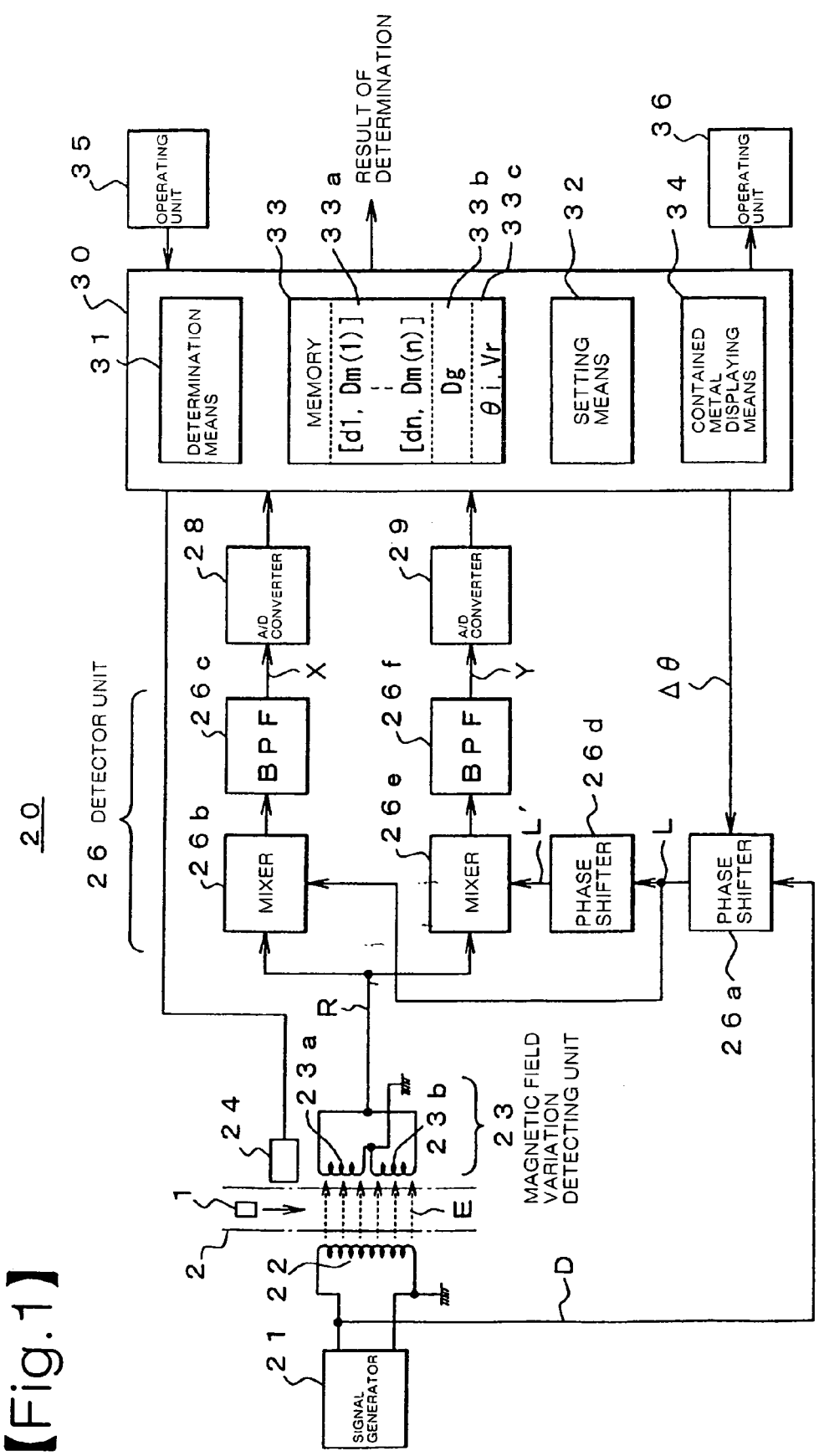
[Fig.1]

[Fig.2]
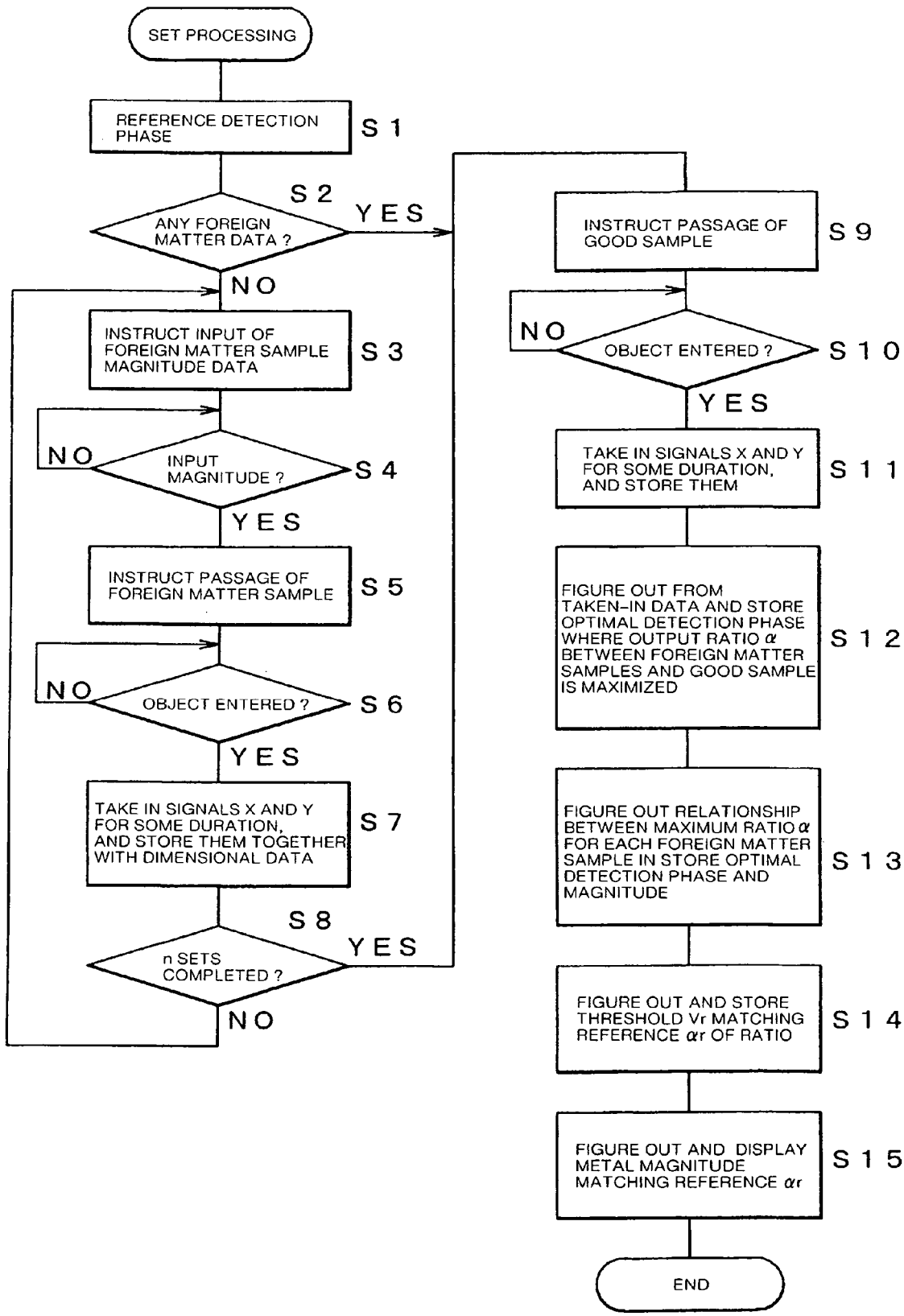

[Fig.3]
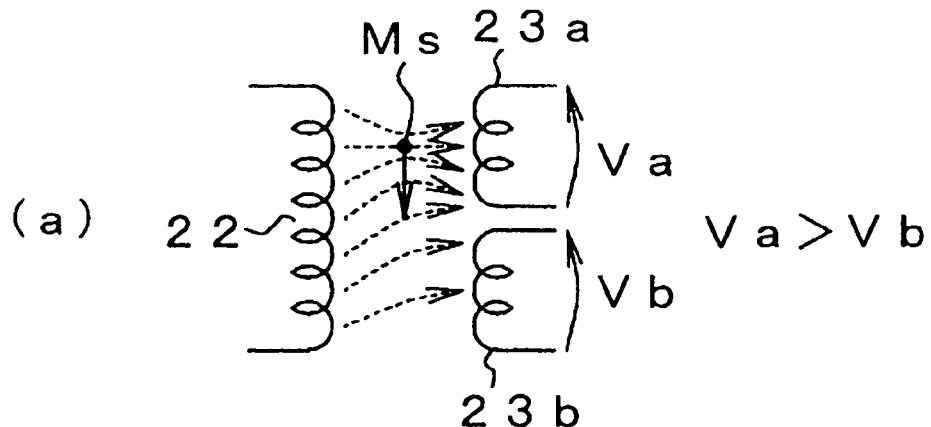
(a) $Va > Vb$
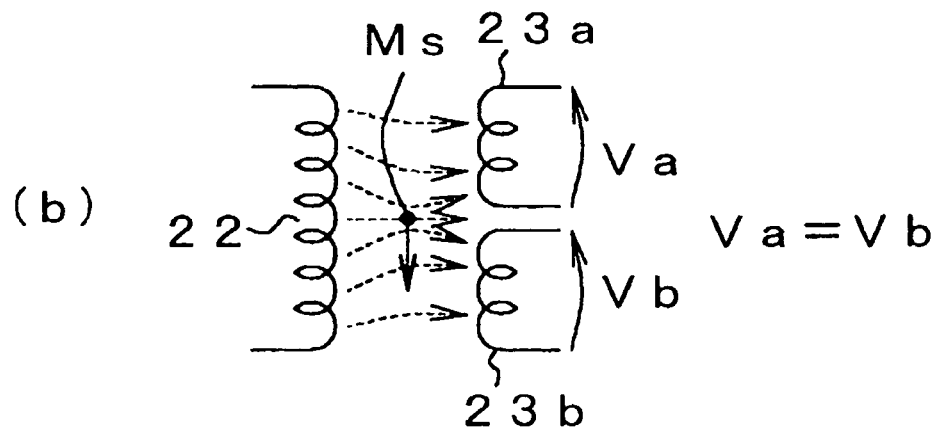
(b) $Va = Vb$
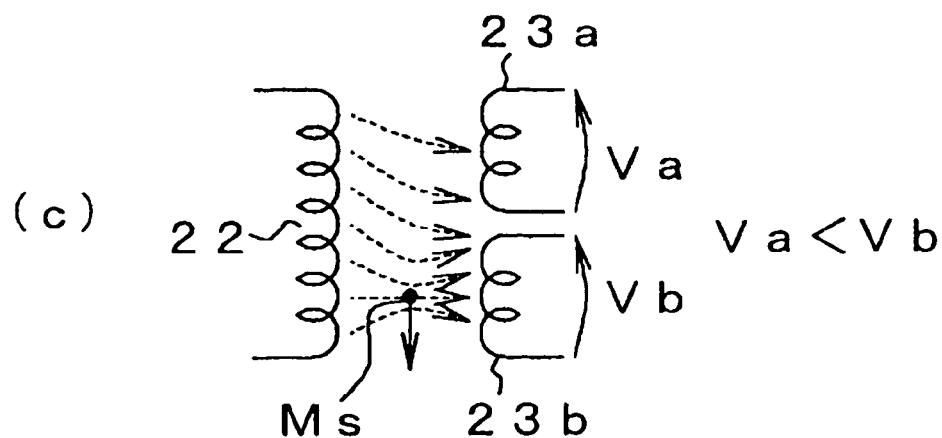
(c) $Va < Vb$

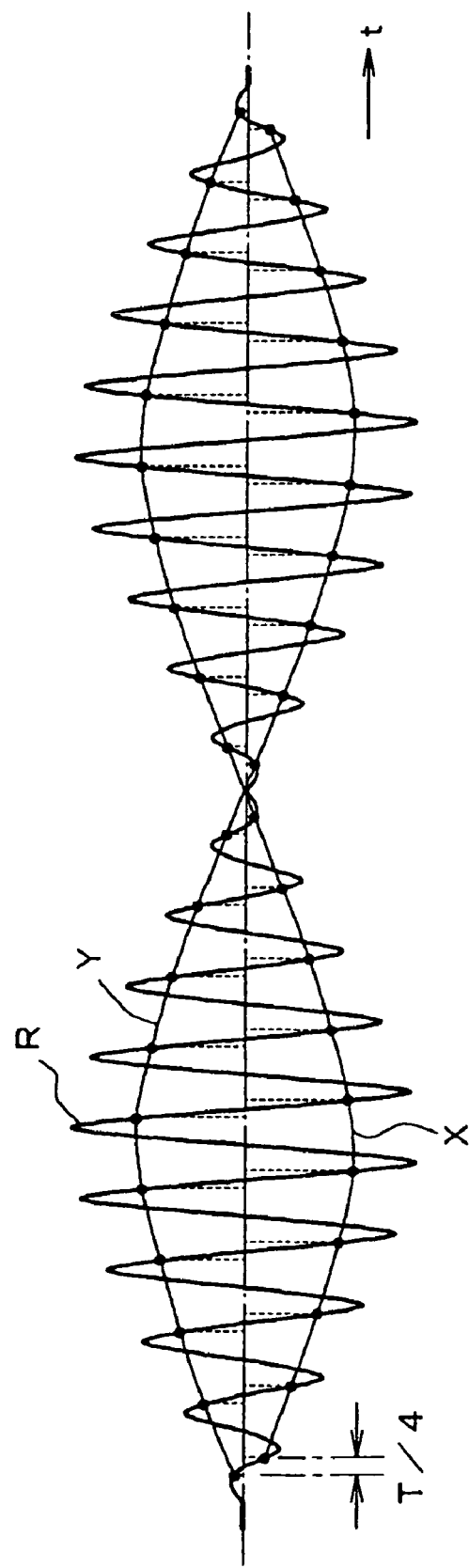

[Fig.5]
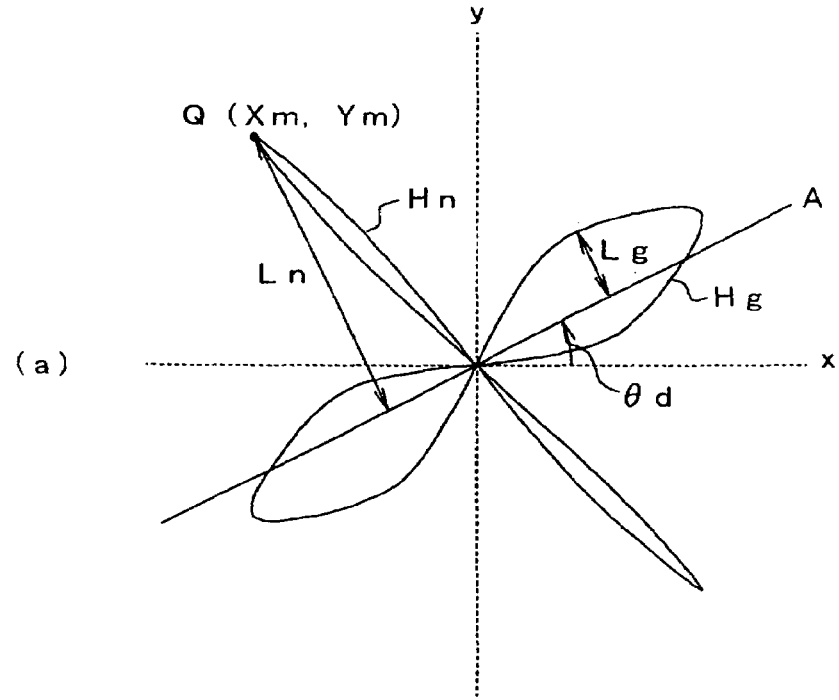
(a)
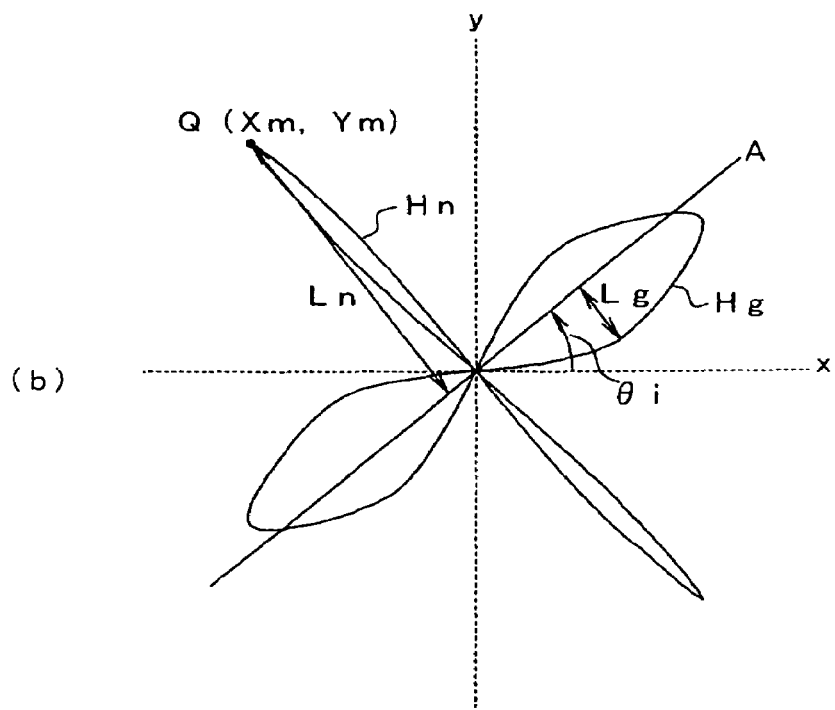
(b)

[Fig.6]
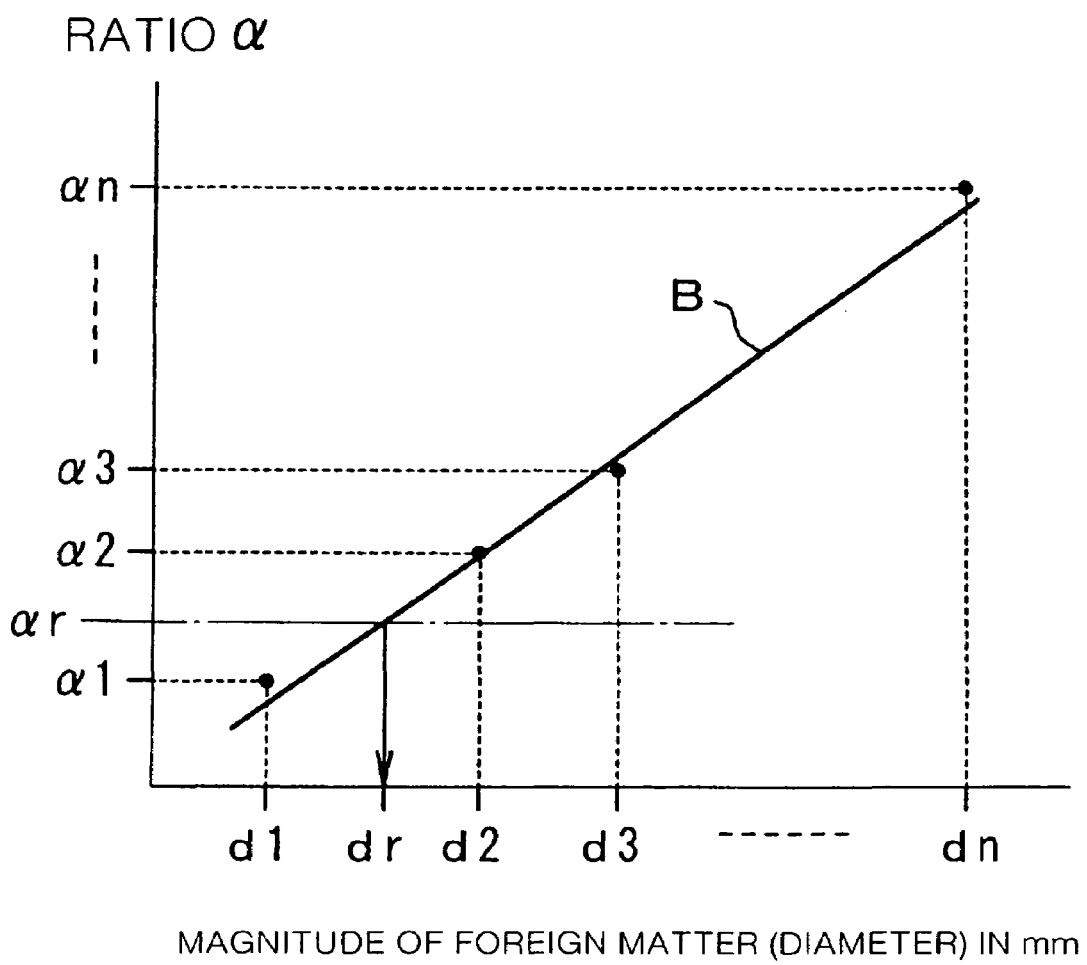

[Fig.7]
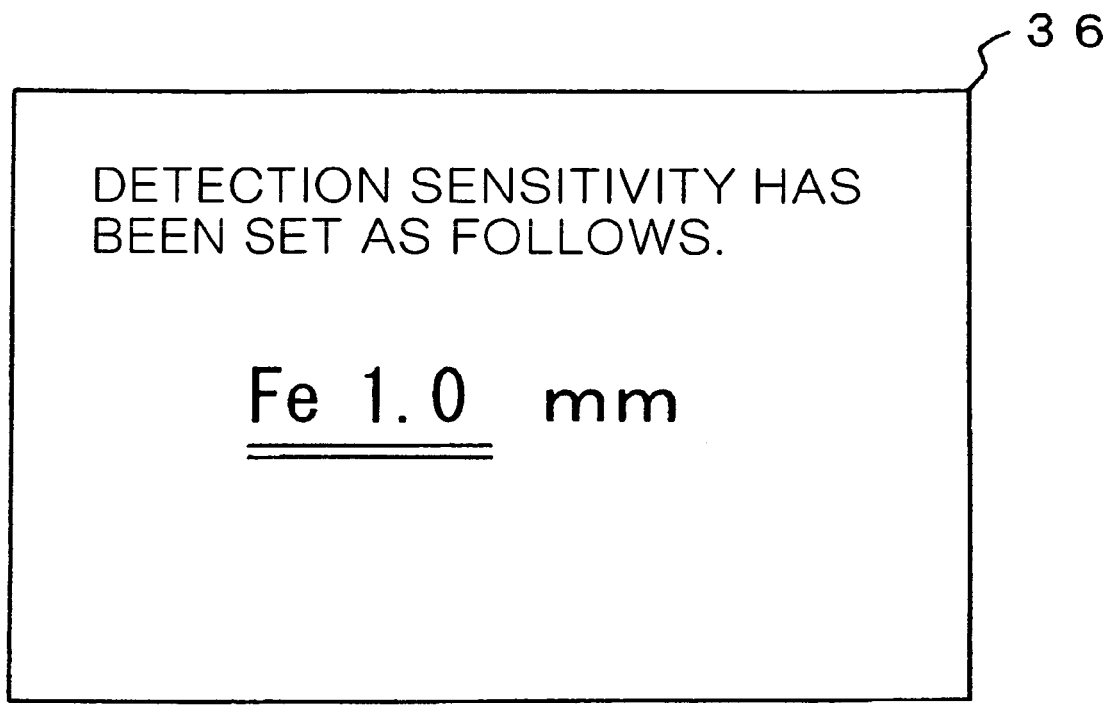

[Fig.8]
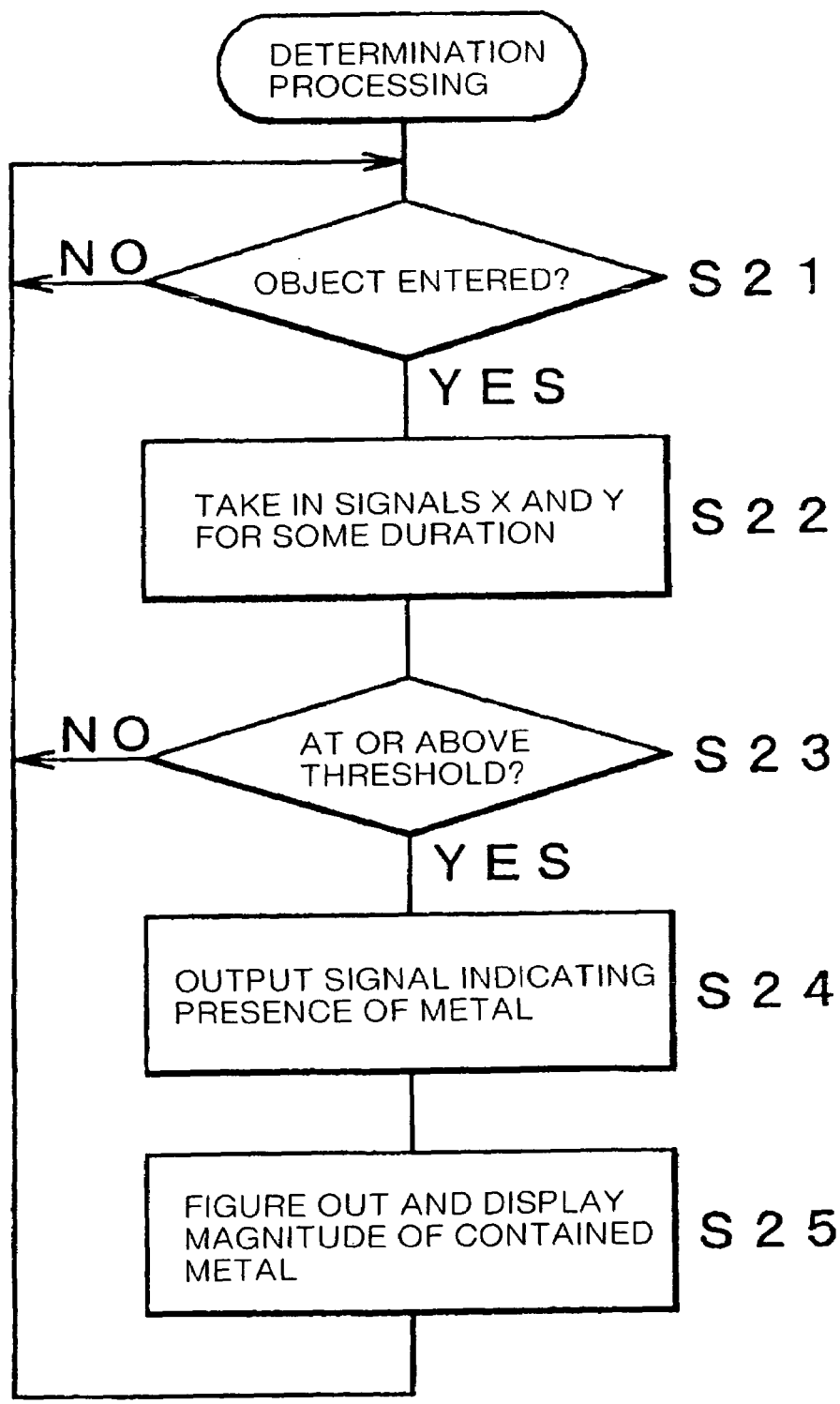

[Fig.9]
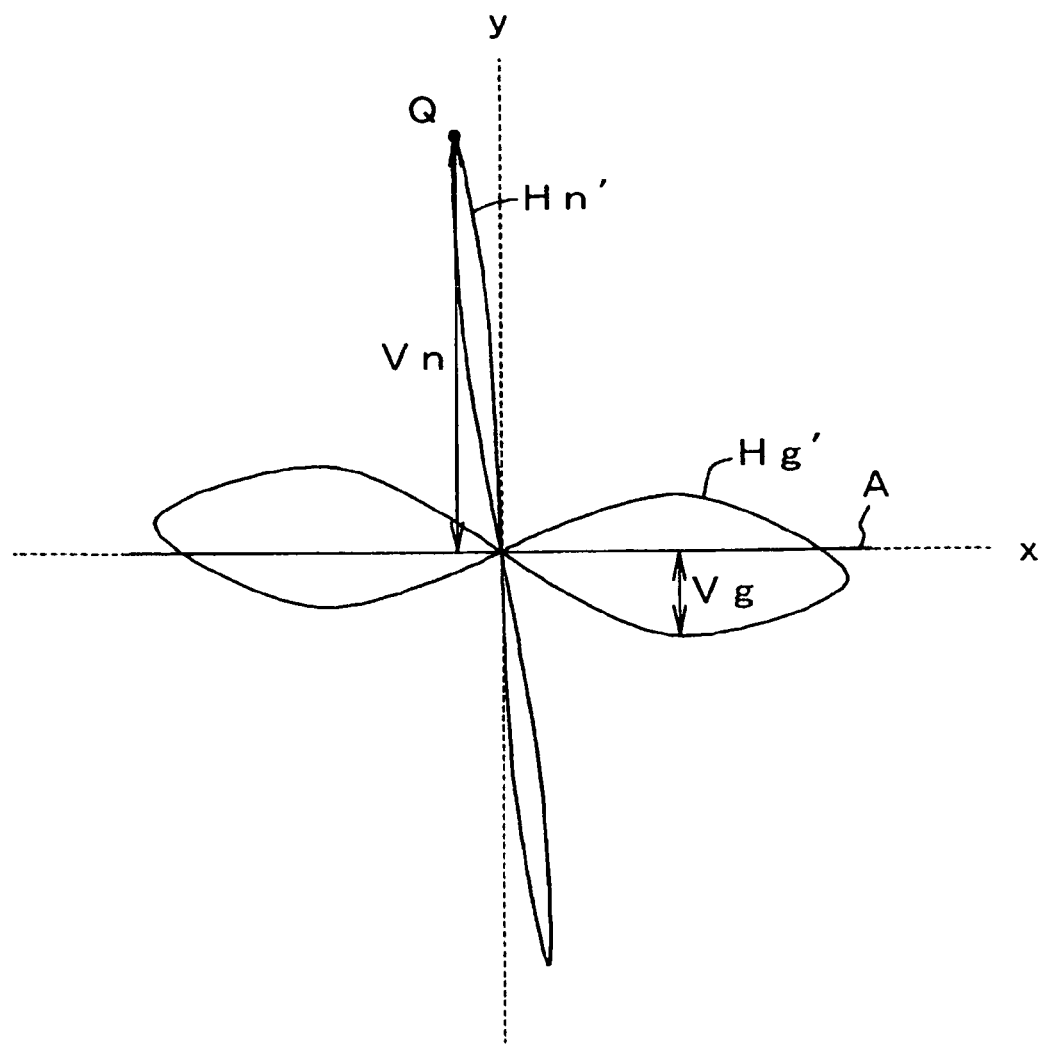

[Fig.10]

METAL IN THE FOLLOWING DIMENSIONAL RANGE HAS BEEN DETECTED.

```
                                             ┌─ 36
┌─────────────────────────────────────────────┐
│     SETTABLE SENSITIVITIES ARE AS FOLLOWS.  │
│  ▷ SENSITIVITY 1                            │
│    (RECOMMENDED) Fe 1.0  mm                 │
│    ─────────────────────────                │
│    SENSITIVITY 2  Fe 1.2  mm                │
│                                             │
│    SENSITIVITY 3  Fe 1.5  mm                │
│                                             │
│    SELECT WITH CURSOR KEY,                  │
│    AND FINALIZE WITH RETURN KEY.            │
└─────────────────────────────────────────────┘
```

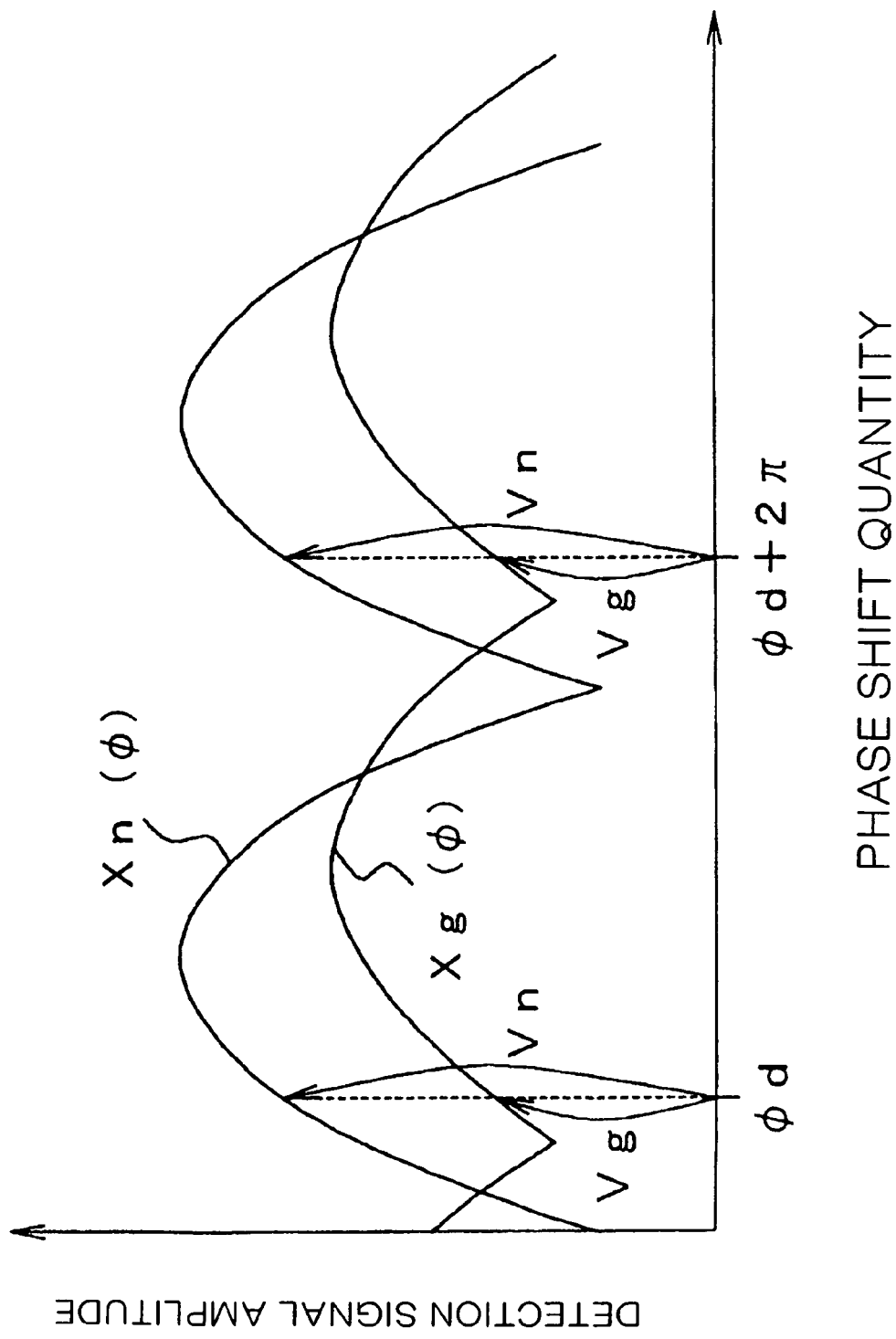

[Fig.13]
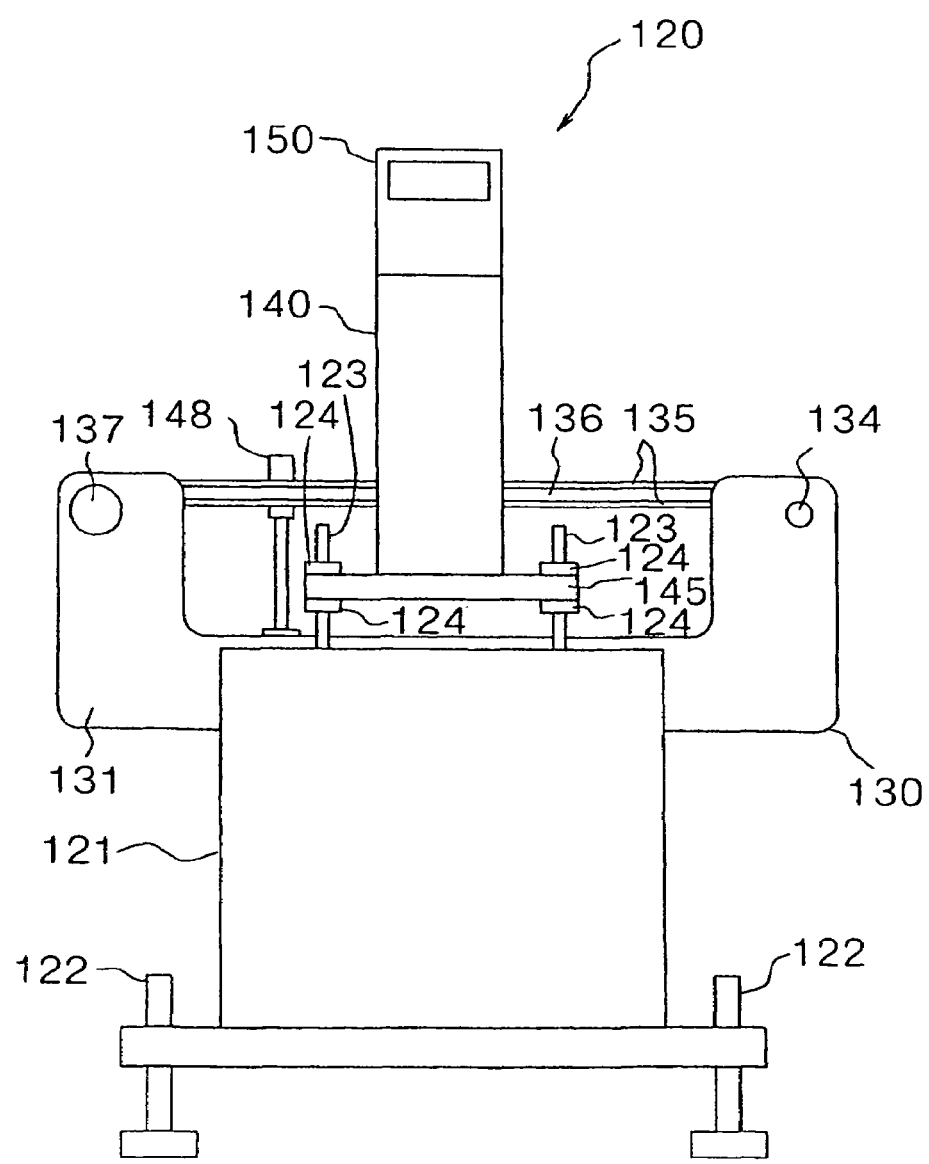

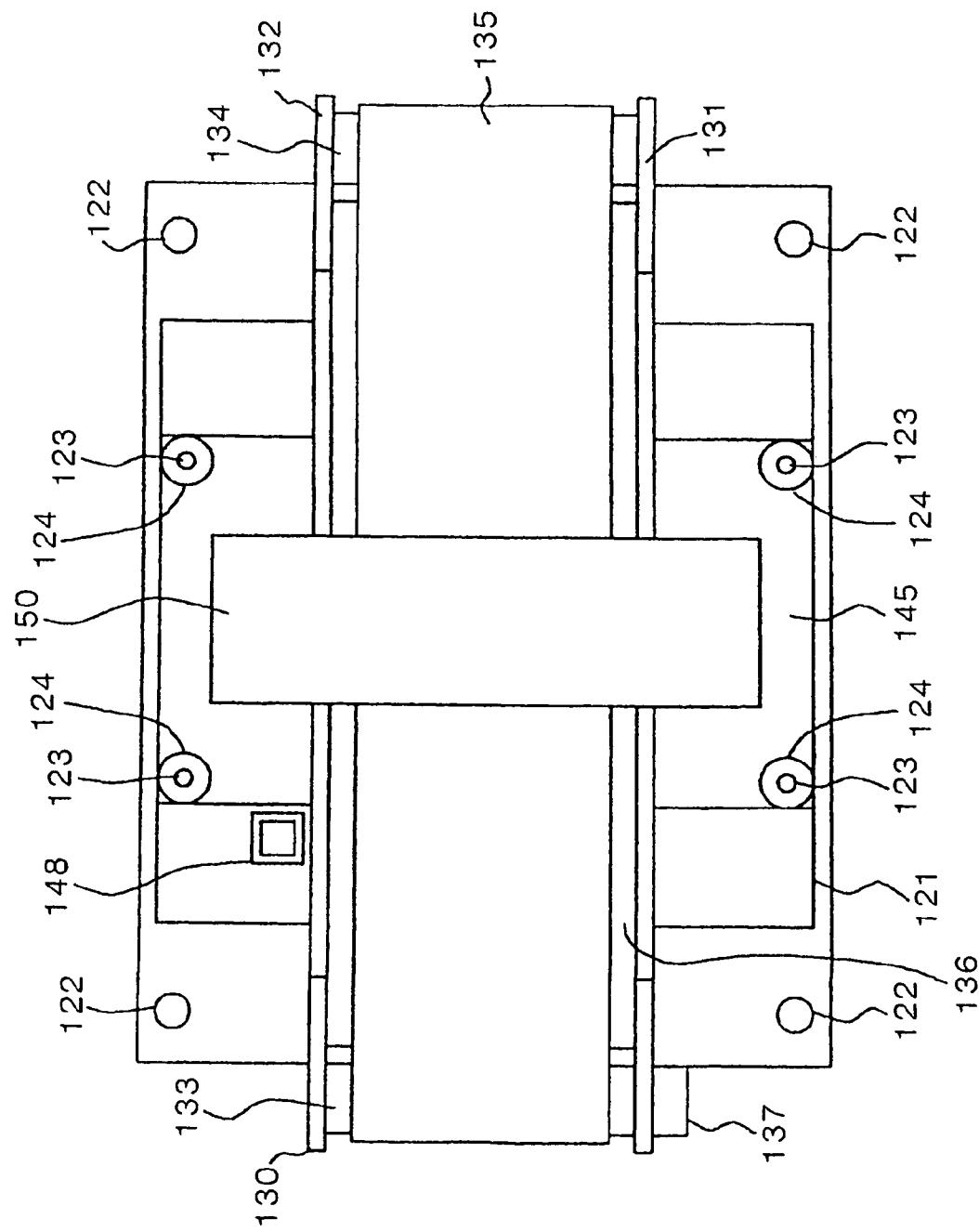
[Fig.14]

[Fig.15]
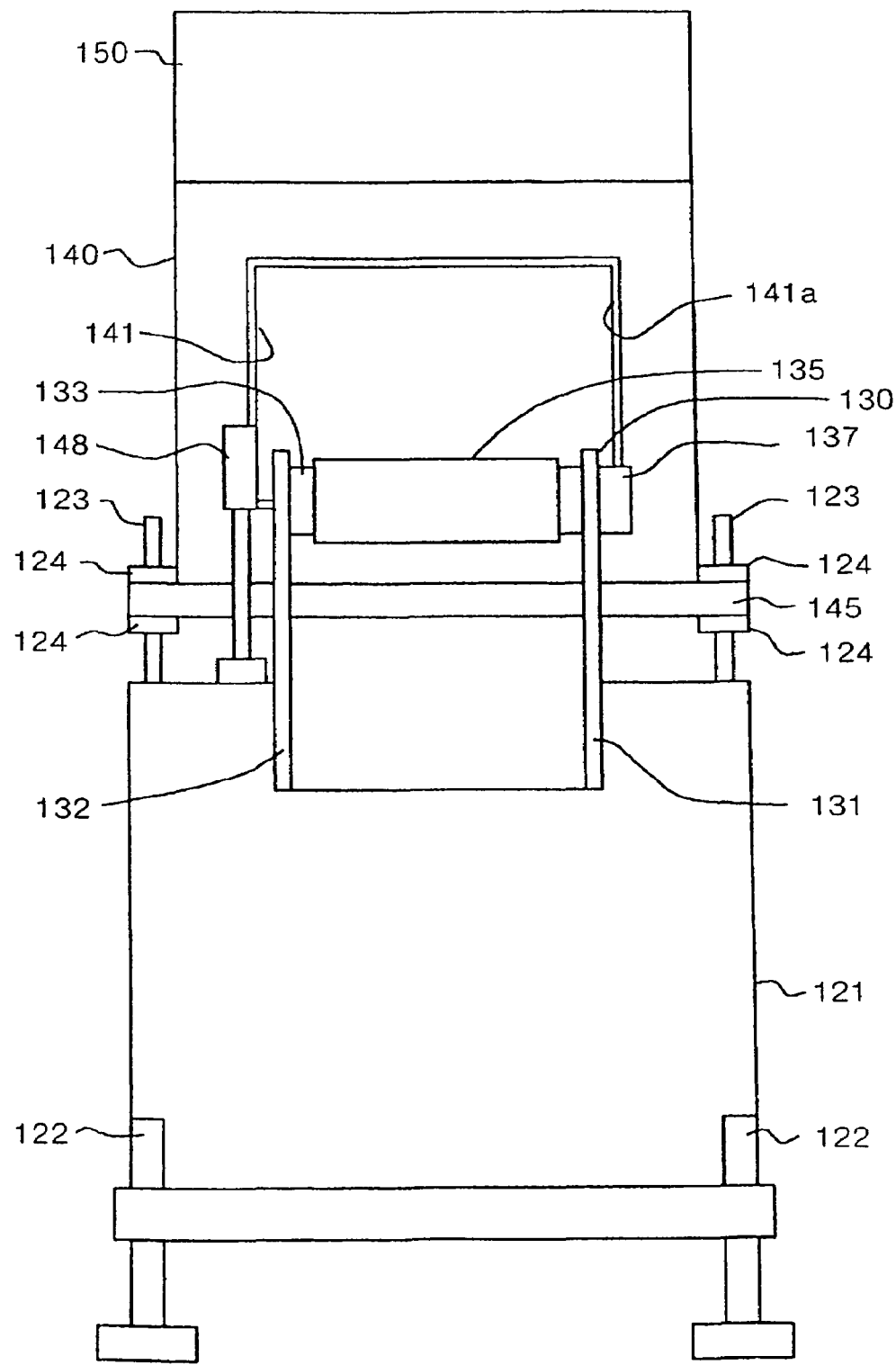

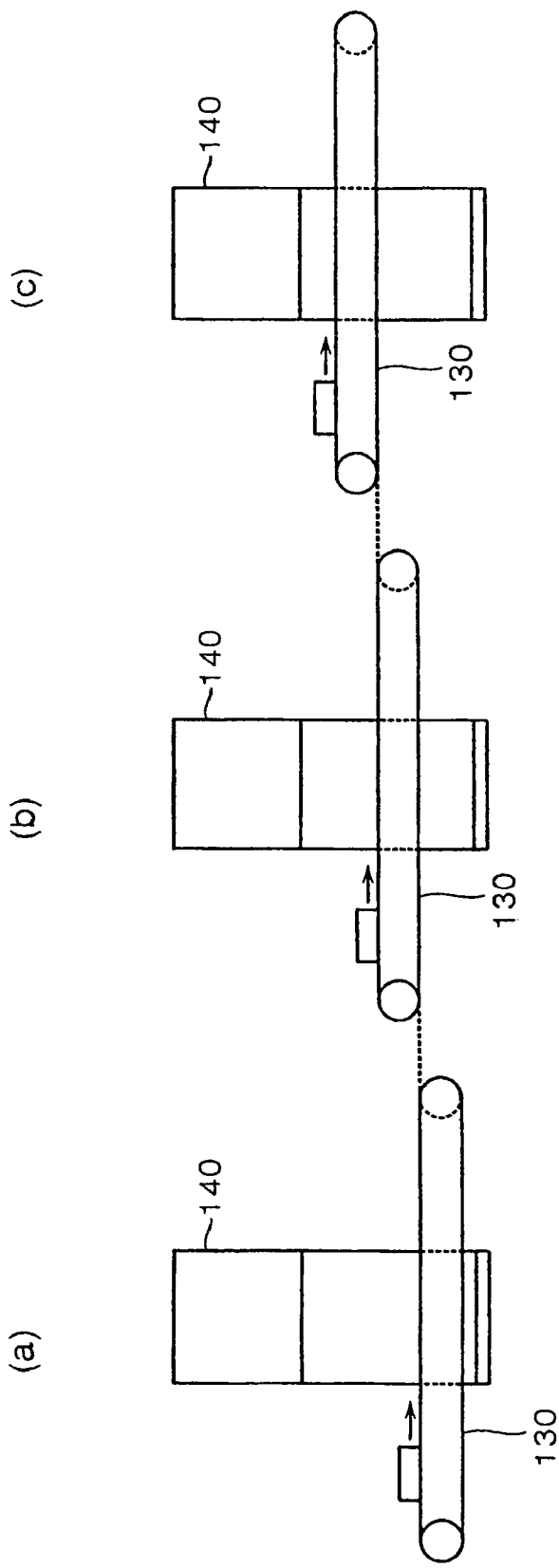
[Fig.16]

[Fig.17]
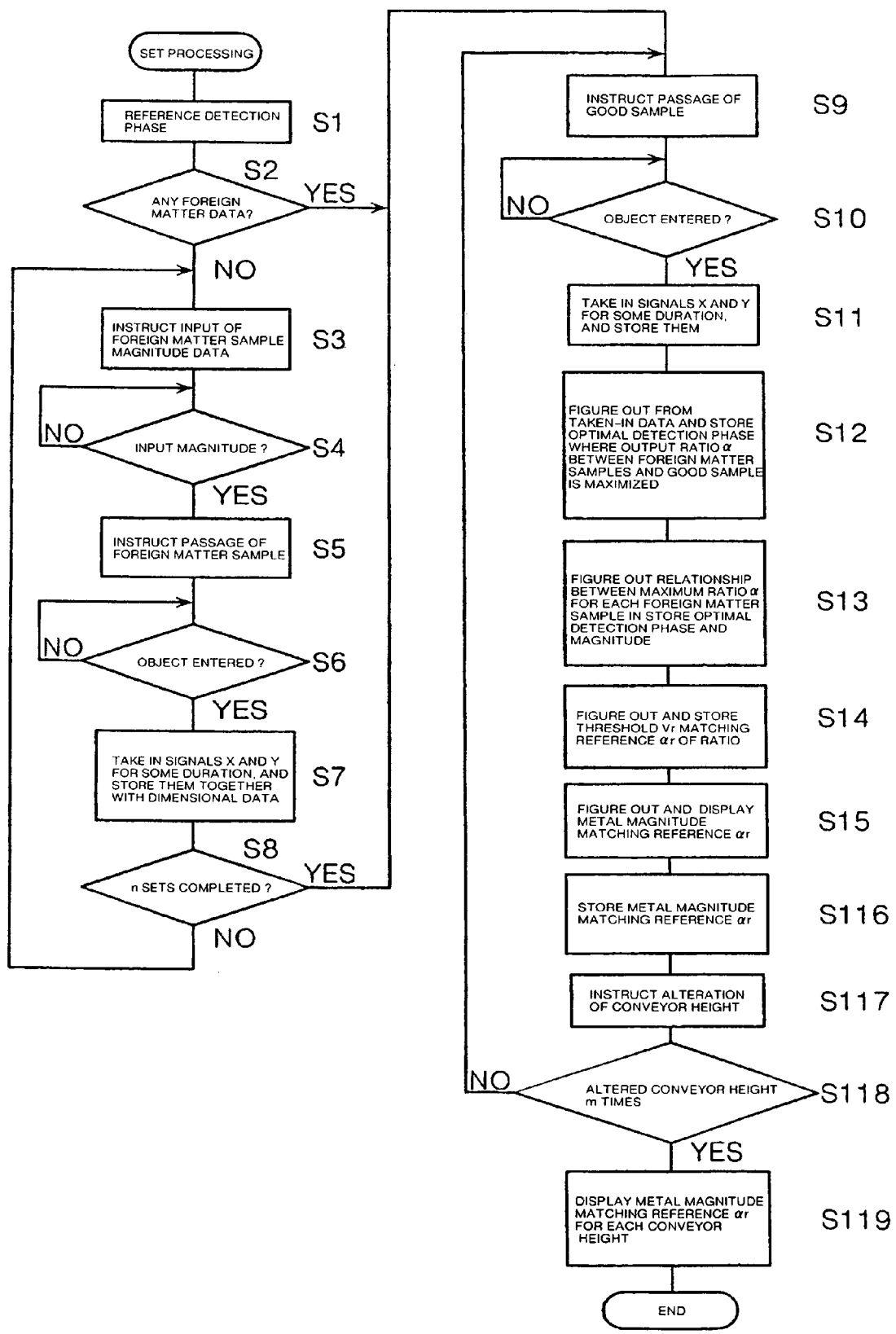

[Fig.18]

SETTABLE SENSITIVITIES ARE AS FOLLOWS.

| | METAL MAGNITUDE | CONVEYOR HEIGHT (INDICATED IN EXTENT OF ALTERATION OF REFERENCE POSITION) | |
|---|---|---|---|
| ▷ Fe | Φ2.0 | 25mm up | |
| Fe | Φ1.0 | 10mm up | |
| Fe | Φ1.5 | 0mm up | (REFERENCE POSITION) |

SELECT WITH CURSOR KEY,
AND FINALIZE WITH RETURN KEY
(OR ALTER CONVEYOR HEIGHT)

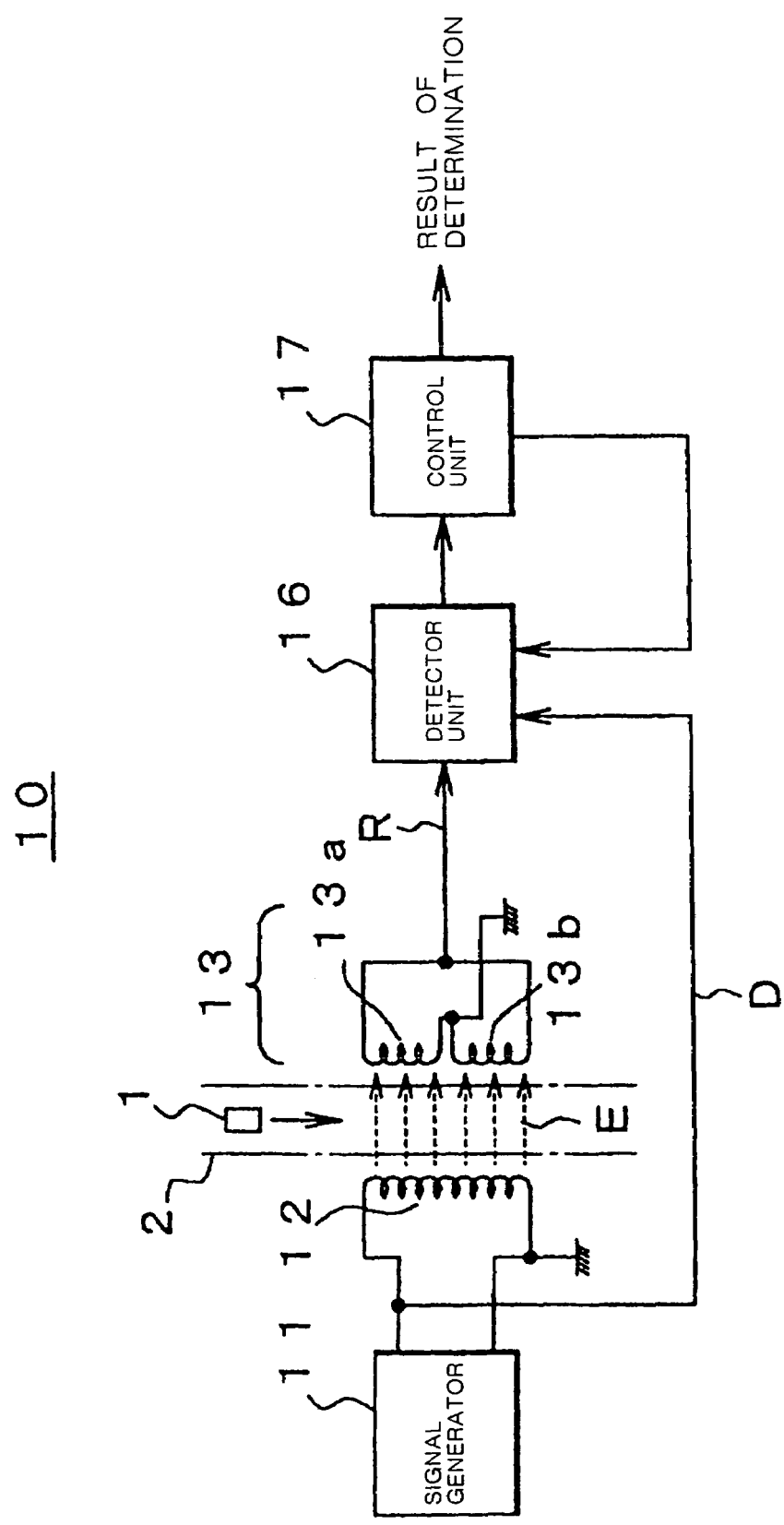

METAL DETECTOR

TECHNICAL FIELD

The present invention relates to a metal detecting apparatus for use on the inspection line of food products or the like to check whether or not any metal is contained in the object of inspection while the object of inspection is being conveyed, and more particularly to a technique which enables the setting of necessary parameters for detection and the identification of the detected metal intuitively.

BACKGROUND ART

Conventional metal detecting apparatuses for use on the inspection line of food products or the like use a method by which, so that any metal contained in the object of inspection can be detected while it is being conveyed, a magnetic field is generated on the conveyance route of the object of inspection, variations in the magnetic field due to any metal contained in the object of inspection are detected.

FIG. 19 shows the configuration of a metal detecting apparatus 10 which detects variations in the magnetic field.

This metal detecting apparatus 10 has a signal generator 11 which supplies a signal D of a prescribed frequency, a transmission coil 12 which receives the signal D and generates an alternating field E of a prescribed frequency on the conveyance route 2 of the object of inspection 1, a magnetic field variation detecting unit 13 which, having two reception coils 13a and 13b arranged in the conveying direction of the object of inspection 1 in such positions that they receive equal quantities of the alternating field E and differentially connected to each other, is to detect a signal matching a variation in the magnetic field due to any object passing the alternating field E, a detector unit 16 which synchronously detects the output signal R of the magnetic field variation detecting unit 13 with a signal having the same frequency as the signal D, and a control unit 17 which determines the presence or absence of any metal in the object of inspection 1 on the basis of the output signal of the detector unit 16.

In the conventional metal detecting apparatus 10 configured as described above, as the signals generated on the two reception coils 13a and 13b are in an equilibrium with their amplitudes and their phases reverse between each other when the object of inspection 1 is absent in the alternating field E, the amplitude of the signal R becomes zero, and so does the output of the detector unit 16. On the other hand, when the object of inspection 1 is present in the alternating field E, as the equilibrium between the signals generated on the two reception coils 13a and 13b is disturbed by the influences of the object of inspection 1 itself and any metal contained in the object of inspection 1, and the signal R whose amplitude and phase varies with the movement of the object of inspection 1 is supplied.

The signal R then contains not only a signal component due to the influence of the contained metal on the alternating field E but also a signal component due to the influence of the object of inspection 1 itself (including the packing material or the like) on the alternating field E, and this latter signal component due to the object of inspection 1 itself determines the detectable limit of the contained metal.

This influence of the object of inspection 1 itself on the alternating field significantly differs with the water content, the packing material and other factors of the object of inspection.

For this reason, according to the prior art, the phase of synchronous detection is so set in advance as to minimize the amplitude of the output signal of the detector unit 16 when a good sample of the object of inspection 1 is caused to pass the alternating field E, a voltage greater than that minimum amplitude is set as the threshold either automatically or manually. Or a multiplying factor for the minimum amplitude is manually designated, a voltage multiplied by that designated factor set as the threshold. The object of inspection 1 is inspected according to one of these thresholds and, when the object of inspection 1 has passed the alternating field E, if the amplitude of the output signal of the detector unit 16 surpasses the threshold, the object of inspection 1 will be determined as containing metallic foreign matter.

One of such techniques by which the threshold for the detection of metal is set in terms of a voltage of a multiplying factor is disclosed in the following Patent Reference:

Japanese Patent No. 2574694

However, a method by which by which the threshold for determining the presence or absence of any metal content is entered or designated in terms of a voltage of a multiplying factor does not allow the user to know intuitively how much metal can be detected.

Moreover, the user cannot know how much metal is present in any object of inspection determined to contain metal, making the method inconvenient for the user to rely on.

An object of the present invention, intended to solve this problem, is to provide a metal detecting apparatus which expresses the threshold for determination or any metal content in the object of inspection in its own magnitude, so that the user can intuitively know how much metal is contained and would find it easier to use.

DISCLOSURE OF THE INVENTION

In order to achieve the object stated above, a metal detecting apparatus according to a first aspect of the present invention has:

a signal generator 21, a transmission coil 22 which receives a signal supplied from the signal generator 21 and causes an alternating field of a frequency equal to the frequency of the signal to be generated on the conveyance route of the object of inspection, a magnetic field variation detecting unit 23 which includes two reception coils 23a and 23b arranged along the conveyance route in positions to receive the alternating field, and supplies a signal matching a variation in the magnetic field due to an object passing the alternating field, a detector unit 26 which subjects the output signal of the magnetic field variation detecting unit 23 to synchronous detection with a signal of a frequency equal to a signal supplied from the signal generator 21, determination means 31 which compares the output signal of the detector unit 26 and a threshold to determine the presence or absence of any metal contained in the object of inspection, and an indicator 36, further provided with:

a memory 33 which stores data of signals supplied by the detector unit 26 when a plurality of metallic foreign matter samples differing in magnitude are caused to pass the alternating field and data representing the magnitude of each foreign matter sample:

wherein the determination means 31 causes the detectable magnitude of metal to be displayed on the indicator 36 on the basis of data on foreign matter samples stored in the memory 33.

A metal detecting apparatus according to a second aspect of the invention derives from the metal detecting apparatus according to the first aspect, further provided with:

an operating unit 35, wherein the magnitude of the foreign matter sample can be designated by working on the operating unit 35, and a threshold matching the designated magnitude is set into the determination means 31.

A metal detecting apparatus according to a third aspect of the invention has:

a signal generator 21, a transmission coil 22 which receives a signal supplied from the signal generator 21 and causes an alternating field of a frequency equal to the frequency of the signal to be generated on the conveyance route of the object of inspection, a magnetic field variation detecting unit 23 which includes two reception coils 23a and 23b arranged along the conveyance route in positions to receive the alternating field, and supplies a signal matching a variation in the magnetic field due to an object passing the alternating field, a detector unit 26 which subjects the output signal of the magnetic field variation detecting unit 23 to synchronous detection with a signal of a frequency equal to a signal supplied from the signal generator 21, determination means 31 which compares the output signal of the detector unit 26 and a threshold to determine the presence or absence of any metal contained in the object of inspection, and an indicator 36, further provided with:

a memory 33 which stores data of signals supplied by the detector unit 26 when a plurality of metallic foreign matter samples differing in magnitude are caused to pass the alternating field and data representing the magnitude of each foreign matter sample, and contained metal displaying means 34 which, when the determination means determines the presence of metal in the object of inspection, figures out the magnitude of the metal contained in the object of inspection on the basis of a signal supplied from the detector unit 26 with respect to the object of inspection and data on foreign matter samples stored in the memory 33, and causes the magnitude to be displayed on the indicator 36.

A metal detecting apparatus according to a fourth aspect of the invention has:

a signal generator 21, a transmission coil 22 which receives a signal supplied from the signal generator 21 and causes an alternating field of a frequency equal to the frequency of the signal to be generated on the conveyance route of the object of inspection, a magnetic field variation detecting unit 23 which includes two reception coils 23a and 23b arranged along the conveyance route in positions to receive the alternating field, and supplies a signal matching a variation in the magnetic field due to an object passing the alternating field, a detector unit 26 which subjects the output signal of the magnetic field variation detecting unit 23 to synchronous detection with a signal of a frequency equal to a signal supplied from the signal generator 21, determination means 31 which compares the output signal of the detector unit 26 and a threshold to determine the presence or absence of any metal contained in the object of inspection, and an indicator 36, further provided with:

a memory 33 which stores data of signals supplied by the detector unit 26 when a plurality of metallic foreign matter samples differing in magnitude are caused to pass the alternating field and data representing the magnitude of each foreign matter sample, and stores data of signals supplied from the detector unit when a good sample is caused to pass the alternating field, wherein the optimal detection phase in which the output ratio between foreign matter samples and the good sample is maximized on the basis of the data on foreign matter samples and data on the good sample stored in the memory, the relationship between the detection output ratio between the good sample and each foreign matter sample in the optimal detection phase is figured out, and the threshold matching the reference level of the ratio is set.

A metal detecting apparatus according to a fifth aspect of the invention derives from the metal detecting apparatus according to the fourth aspect, wherein the positions of the conveyance route relative to the alternating field can be altered, and wherein a good sample is caused to pass the alternating field in the plurality of different positions set by the alteration to figure out the threshold for each position, and each position and the magnitude of foreign matter detectable according to each threshold in each position are caused to be displayed on indicator 36.

A metal detecting apparatus according to a sixth aspect of the invention derives from the metal detecting apparatus according to any of the first through fifth aspects, wherein data of signals supplied from said detector unit 36 when each of a plurality of metallic foreign matter samples differing in magnitude is caused to pass said alternating field of said metal detecting apparatus are acquired as master data, and wherein the master data are caused to be stored in memories 33 of other metal detecting apparatuses, each of said plurality of foreign matter samples is caused to pass the alternating field of said other metal detecting apparatuses, and the master data are corrected with the data of signals supplied from the detector unit 26.

BRIEF DESCRIPTION OF THE DRAWINGS

FIG. 1 shows the configuration of a preferred embodiment of the present invention.

FIG. 2 is a flow chart of the processing sequence in the mode of setting the essential parts of the embodiment.

FIG. 3 show the relationship between the position of a foreign matter sample and variations of the magnetic field.

FIG. 4 is a signal chart matching variations of the magnetic field.

FIG. 5 are charts of the Lissajous waveform of the detection output.

FIG. 6 shows the relationship between the ratio and the magnitude.

FIG. 7 shows an example of display of a magnitude matching a set threshold.

FIG. 8 is a flow chart of the processing sequence in the mode of inspecting the essential parts of the embodiment FIG. 9 is a chart of the Lissajous waveform in a state of the optimal detection phase.

FIG. 10 shows an example of display of the magnitude of contained metal.

FIG. 11 shows an example of display of detectable magnitudes.

FIG. 12 illustrates another method of figuring out the detection phase.

FIG. 13 shows a front view of a second preferred embodiment of the present invention.

FIG. 14 shows a plan of the second embodiment of the invention.

FIG. 15 shows a profile of the second embodiment of the invention.

FIG. 16 schematically show front views of a state in which the position of the conveyance route is altered in the second embodiment of the invention.

FIG. 17 is a flow chart of the processing sequence in the mode of setting the essential parts of the second embodiment.

FIG. 18 shows an example of display of detectable magnitudes in the second embodiment of the invention.

FIG. 19 shows the configuration of an apparatus according to the prior art.

BEST MODE FOR CARRYING OUT THE INVENTION

A first preferred embodiment of the present invention will be described below with reference to accompanying drawings.

FIG. 1 shows the configuration of a metal detecting apparatus 20 to which the invention is applied.

Referring to FIG. 1, a signal generator 21 generates a signal D of a prescribed frequency and supplies it to a transmission coil 22 and a detector unit 26 to be described afterwards.

The transmission coil 22, receiving the signal D generates on a conveyance route (usually formed of a conveyor) 2 for an object of inspection 1 an alternating field E equal to that signal D in frequency.

The alternating field E generated by the transmission coil 22 is received by two reception coils 23a and 23b of a magnetic field variation detecting unit 23. The magnetic field variation detecting unit 23 is intended for supplying signals matching variations of the magnetic field due to an object passing the alternating field E. The two reception coils 23a and 23b are arranged in the conveying direction of the object of inspection 1 in such positions that they receive equal quantities of the alternating field E and differentially connected to each other.

Incidentally, the transmission coil 22 and the two reception coils 23a and 23b are fixed to a common frame which, for instance, surrounds the conveyance route 2 so that their relative positions may not vary.

There are alternative arrangements of these transmission coil 22 and reception coils 23a and 23b. In one way, the transmission coil 22 and the two reception coils 23a and 23b are arranged opposite each with the conveyance route 2 in-between. In another, before and behind the transmission coil 22 so wound as to surround the conveyance route 2, the reception coils 23a and 23b are respectively arranged coaxially. In still another way, the transmission coil 22 and the two reception coils 23a and 23b are arranged on the same plane over the upper or lower face of the conveyance route 2.

Since the two reception coils 23a and 23b are differentially connected in such positions that they receive equal quantities of the alternating field E, the signals generated on the two reception coils 23a and 23b are equal in amplitude and reverse in phase when the alternating field E is not affected by the object of inspection 1 or any contained metal, and accordingly the amplitude of the signal R between the connection points becomes zero.

The description below will refer to a case in which the two reception coils 23a and 23b of the magnetic field variation detecting unit 23 are differentially connected, but the magnetic field variation detecting unit 23 may as well be so configured that the signals generated on the two reception coils 23a and 23b are subjected to subtraction by an analog subtractor. Further, where the magnetic field received by the two reception coils 23a and 23b are not equal in quantity, the difference between the signals generated on the reception coils 23a and 23b may be corrected by a variable resistor or amplifiers differing in magnification.

In the vicinity of the conveyance route 2, there is further provided an optical entrance sensor 24 for detecting the timing of the entrance of the object of inspection 1 into the alternating field E. Incidentally, the entrance of any object into the magnetic field can as well be detected by variations in the amplitudes of output signals X and Y of the detector unit 26 to be described afterwards. In that case, the entrance sensor 24 can be dispensed with.

The detector unit 26 synchronously detects the output signal R of the magnetic field variation detecting unit 23 with a signal equal to the signal D in frequency.

The detector unit 26 in this embodiment of the invention, being of an orthogonal two-phase type, is configured of a phase shifter 26a for shifting the signal D in phase, a mixer 26b for mixing an output signal L of the phase shifter 26a with the signal R, a BPF 26c for extracting from the mixer 26b a low frequency component matching the conveyance speed of the object of inspection 1, a phase shifter 26d for shifting the signal L by 90 degrees in phase, a mixer 26e for mixing the signal R with an output signal L1 of the phase shifter 26d, and a BPF 26f for extracting from the output of the mixer 26e a low frequency component matching the conveyance speed of the object of inspection 1.

Signals X and Y supplied from the two BPFs 26c and 26f of the detector unit 26 are converted into digital values by A/D converters 28 and 29, respectively, and the converted signals entered into a computer-configured control unit 30.

The control unit 30 has determination means 31 which, detecting the entrance of the object of inspection 1 into the alternating field E from the output signal of the entrance sensor 24 (or variations in the amplitudes of the output signals X and Y of the detector unit as mentioned above), takes in the output signals X and Y of the detector unit 26, determines the presence or absence of metal in the object of inspection 1 by comparing the data of the signals so taken in with a preset threshold, and supplies the result of that determination; setting means 32 for setting various parameters required for inspecting the object of inspection 1; a nonvolatile memory 33 for storing those parameters and data necessary for setting the parameters; and contained metal displaying means 34 which, when the determination means 31 has determined that any metal is contained in the object of inspection, causes an indicator 36, to be described afterwards, for indicating the magnitude of that metal content.

This control unit 30, connected to an operating unit 35 and the indicator 36, causes the setting means 32 to process setting of various parameters when the operating unit 35 has designated a setting mode. Or when the operating unit 35 has designated an inspection mode, the control unit 30 causes the determination means 31 to check the presence of any metal in the object of inspection 1 and to process outputting of the result of that inspection. If the presence of any metal in the object of inspection is determined, the magnitude of the metal content will be displayed on the indicator 36.

The necessary parameters for the inspection include the length and conveyance speed of the object of inspection 1, the frequency of the signal D supplied by the signal generator 21, the detection phase of the detector unit 26 (the phase shift quantity by the phase shifter 26a) and the threshold for determining the presence or absence of any foreign matter.

Here, the length and conveyance speed of the object of inspection are parameters for determining the intervals and durations of taking in the output signals X and Y of the detector unit 26 and the bands of the BPFs 26c and 26f of the detector unit 26 among other factors. The frequency of the signal D is a parameter to be selected according to the type of the metal to be detected and the material of the object of inspection 1 itself (including the packing material).

The detection phase of the detector unit 26 is a parameter for determining sensitivity to any metal content.

The threshold for determination is intended for use in determining the presence or absence of any metal in the object of inspection 1, and its setting is processed by the setting means 32.

Whereas the setting means 32, so configured as to be able to set these parameters either manually or semi-automatically by working on the operating unit 35, the following description will refer to processing to set the detection phase to its optimum and set in that detection phase the threshold for determining the presence or absence of any foreign matter. Incidentally, though only those signal lines necessary for setting the detection phase are shown in FIG. 1, actually the frequency of the signal D supplied by the signal generator 21 and the bands of the BPFs 26c and 26f of the detector unit 26, among other factors, can also be controlled.

FIG. 2 is a flow chart of the sequence of processing by the setting means 32 regarding the setting of the detection phase and the threshold. The operations to process the setting will be described below with reference to this flow chart.

When, for instance, processing to set the threshold for determining the detection phase is selected by working on the operating unit 35, it is determined, in a state in which the phase shift quantity Δθ of the phase shifter 26a is set as the reference (e.g. 0), whether or not data Dm on a foreign matter sample are stored in a prescribed area 33a of the memory 33 (S1 and S2).

If the foreign matter data Dm are stored, the processing will shift to step S9 to be described afterwards. Or if the foreign matter data Dm are not stored, it will be instructed to enter data representing the magnitude of a foreign matter sample Ms of the metal to be detected. When the operator enters the data by working on the operating unit 35, an instruction is given to cause that foreign matter sample Ms to pass the alternating field E (S3 through S5). These instructions are given by displaying on the indicator 36 for instance.

The operator so instructed, after entering the diameter d1 of one foreign matter sample Ms1 for instance as a datum representing the magnitude by working on the operating unit 35, mounts that foreign matter sample Ms1 on the conveyance route 2 and causes it to pass the alternating field E.

Although the description here refers to a case in which the magnitudes of the foreign matter sample and of the metal content in diameters, the magnitudes of the foreign matter sample and of the metal content in the context of the present invention shall include the length, square measure and volume besides the diameter.

The setting means 32, after giving the instruction to cause the foreign matter sample Ms to pass the magnetic field, will take in the output signals X and Y of the detector unit 26 for a prescribed duration if the entrance of an object is detected from the output signal of the entrance sensor 24, and stores the relevant data Dm (1), matched with the diameter datum d1, into the prescribed area 33a of the memory 33 (S6 and S7).

Here, if the foreign matter sample Ms1 is of a magnetic material having a property to attract magnetic fluxes, such as iron, when the foreign matter sample Ms1 is moving near the reception coil 23a as shown in FIG. 3(a), some of the magnetic fluxes crossing the reception coil 23b, out of the magnetic fluxes supplied from the transmission coil 22, will be attracted by the foreign matter sample Ms1 and cross the reception coil 23a in addition to the magnetic fluxes crossing the reception coil 23a from the outset, with the result that the amplitude Va of the signal generated on the reception coil 23a side becomes greater than the amplitude Vb of the signal generated on the reception coil 23b side.

Or when the foreign matter sample Ms1 is in an intermediate position between the two reception coils 23a and 23b as shown in FIG. 3(b), some of the magnetic fluxes crossing the reception coil 23a and some of the magnetic fluxes crossing the reception coil 23b, both from the outset, out of the magnetic fluxes supplied from the transmission coil 22, will be attracted by the foreign matter sample Ms1 in equal quantities, with the result that the amplitude Va of the signal generated on the reception coil 23a side and the amplitude Vb of the signal generated on the reception coil 23b become equal.

Or when the foreign matter sample Ms1 is moving near the reception coil 23b as shown in FIG. 3(c), some of the magnetic fluxes crossing the reception coil 23a, out of the magnetic fluxes supplied from the transmission coil 22, will be attracted by the foreign matter sample Ms1 and cross the reception coil 23b in addition to the magnetic fluxes crossing the reception coil 23b from the outset, with the result that the amplitude Vb of the signal generated on the reception coil 23b side becomes greater than the amplitude Va of the signal generated on the reception coil 23a side.

Therefore, the waveform of the signal R when the foreign matter sample Ms1 passes the alternating field E will be that of a modulated wave whose amplitude varies up and down as shown in FIG. 4. On the other hand, the waveform of the signal X obtained by synchronous detection processed on this signal R by the detector unit 26 constitutes an envelope connecting the instantaneous value of each prescribed phasic position of the signal R as shown in FIG. 4, with the amplitudes of the signals L and L' of the detector unit 26 being supposed to be 1. The waveform of the signal Y constitutes an envelope connecting the instantaneous value of a position 90 degrees away from each prescribed phasic position of the signal R (a position T/4 away from the period of the signal D represented by T).

Plotting coordinate points determined by the thereby obtained two signals X and Y on xy coordinates gives an 8-shaped waveform (Lissajous waveform) Hn as shown in FIG. 5(a) for instance.

When only the metallic foreign matter sample Ms1 is caused to pass the alternating field E as described above, a narrow Lissajous waveform which is substantially symmetric with respect to the origin of coordinates, such as the waveform Hn, is obtained. Therefore, instead of coordinate data for the whole waveform, the coordinates (Xm, Ym) of the vertex Q or coordinates (r, θ) obtained by subjecting them to polar coordinate conversion may as well be stored as data on the characteristic point of the foreign matter sample Ms.

It is to be noted that the distance r from the origin and the angle θ are respectively represented by:

$$r=(Xm^2+Ym^2)^{1/2}$$

$$\theta=\tan^{-1}(Ym/Xm)$$

After the data Dm (1) on the foreign matter sample Ms having the diameter d1 are acquired in this way, instructions to enter the diameter datum of a foreign matter sample of a different magnitude and to cause passage of the magnetic field are given in the same way as described above, and respective foreign matter data Dm (1) through Dm (n) on a plurality n of foreign matter samples Ms1 through Msn having passed the alternating field E are figured out. Respectively matched with the diameter data d1 through dn, they are stored into the prescribed area 33a of the memory 33 (S8).

Incidentally, Lissajous waveforms obtained of foreign matter samples of the same metal but differing in magnitude are similar figures, substantially the same in the angle θ and varying in the distance r from the origin with the magnitude of the foreign matter out of the polar coordinates of its vortex.

Next, an instruction is given, with the phase shift quantity Δθ of the phase shifter 26a being kept set to the reference (e.g. 0), to cause a good sample, which is known to contain no metal, out of the objects of inspection 1 to be inspected, to pass the magnetic field E (S9).

When the operator, following this instruction, places the good sample on the conveyance route 2 and causes it to pass the alternating field E, the setting means 32 detects, in the same way as described above, the entrance of the object into the alternating field E from the output signal of the entrance sensor 24 (S10), takes in the output signals X and Y of the detector unit 26 for a prescribed duration, and stores the data Dg of the signals X and Y into a prescribed area 33b of the memory 33 (S11).

Though this good sample usually is of a non-magnetic material, the signal R whose amplitude varies up and down from the magnetic field variation detecting unit 23 in the same way when the foreign matter sample Ms is caused to pass because the water content, the aluminum packing material or the like of that good sample causes the magnetic field to vary. Therefore, synchronous detection of the signal R by the detector unit 26 gives the data Dg of the signals X and Y which forms a Lissajous waveform Hg like what is shown in FIG. 5(a) for instance.

At a stage where data on a plurality of foreign matter samples differing in magnitude and data on the good sample have been acquired as described above, the setting means 32, on the basis of these sets of data, figures out as the optimal detection phase θi a phase which would maximize the ratio of the detection output of the smallest-diameter foreign matter sample Ms (min), for instance, to that of the good sample (the object of inspection itself), and stores that phase (S12).

In this processing, by using data on the two Lissajous waveforms Hn and Hg shown in FIG. 5(a), the ratio α=Ln/Lg between the maximum distance LN from each set of coordinates of the waveform Hn of the smallest-diameter foreign matter sample Ms (min) (or coordinates of only the aforementioned point Q could suffice) to a straight line A having an angle matching a certain detection phase θd and the maximum distance Lg from each set of coordinates of the waveform Hg of the good sample to the straight line A is figured out with respect to different detection phases θd, and the phase where the ratio α is maximized as shown in FIG. 5(b) is determined as the optimal detection phase θi. Information on this optimal detection phase θi is stored into a prescribed area 33c of the memory 33 as a parameter to be set in the phase shifter 26a of the detector unit 26 at the time of inspecting the object of inspection 1.

After the optimal detection phase θi for the object of inspection is obtained in this way, the relationship between the ratio α between the detection output of the good sample and that of each foreign matter sample in the optimal detection phase θi and the magnitude (diameter) of each foreign matter sample is figured out (S13).

Thus, as shown in FIG. 6, the respective ratios α1 through αn are figured out for the foreign matter sample Ms1 through Msn, and the formula of a straight line B (which may be a curve instead) to relate approximately the diameter and the ratio is worked out. In this drawing, the diameter is supposed to successively increase from the foreign matter sample Ms1 upward.

Then, a voltage Vr (a voltage corresponding to twice the distance Lg) at which the ratio α becomes equal to the reference αr (e.g. αr=2) is obtained as a threshold Vr to be set in the determination means 31 at the time of inspecting the object of inspection 1, and is stored into the memory 33 (S14).

Further the diameter dr of a metallic foreign matter matching the reference αr is figured out from the straight line B, and that diameter is displayed, for instance on the indicator 36 as shown in FIG. 7, as the minimum magnitude of a metallic foreign matter detectable by the determination means 31 (S15).

By checking this display, the user can intuitively grasp the minimum detectable magnitude of a metallic foreign matter in the object of inspection 1.

When the inspection mode is designated, the setting means 32 sets in the phase shifter 26a the information on the optimal detection phase θi stored in the prescribed area 33c of the memory 33, sets the detection phase of the detector unit 26 to the optimal detection phase θi, and sets other parameters required for the inspection of the object of inspection 1 including the threshold Vr where they are required.

In this state which the necessary parameters for the inspection are set, inspection of the object of inspection 1 is carried out by the determination means 31.

FIG. 8 charts the processing sequence in this inspection mode, wherein the determination means 31, upon detection of the object of inspection 1 by the entrance sensor 24 (S21), takes in the detection signals X and Y for a certain duration (S22), compares the magnitudes of the signals with the threshold Vr, determines whether or not any metal is present in the object of inspection 1 (S23), and supplies the result of that determination (S24).

If in this inspection mode any object of inspection 1 containing metal of the same kind as the aforementioned foreign matter sample Ms and measuring dr or more in diameter passes the magnetic field E, the Lissajous waveforms of the signals X and Y supplied from the detector unit 26 will become what would be formed by synthesizing on the time axis Lissajous waveforms Hn' and Hg' resulting from the rotation of the Lissajous waveforms Hn and Hg of FIG. 5 by an equivalent of the optimal detection phase θi as shown in FIG. 9 (rotating them so that the straight line A coincide with the x axis). To focus on the signal Y along the y axis, the ratio Vn/Vg between the amplitude Vg of a signal generated by the influence of the object of inspection 1 itself on the magnetic field within the period of time in which the object of inspection 1 passes the alternating field E and the amplitude Vn of a signal generated by the influence of any metal content reaches its maximum matching the aforementioned distance ratio α and becomes not smaller than the reference αr (=2).

Thus, when the above-stated optimal detection phase θi is set, the determination means 31 determines the presence or absence of any metal content by comparing the maximum amplitude of the signal Y and the threshold Vr. As the maximum amplitude of the signal Y then is 2Vg (=Vr) or more and no less than the threshold, the determination means 31 supplies a signal indicating the presence of metal.

Or if no metal is found present in the object of inspection 1, only the signals X and Y matching the Lissajous waveform Hg' of FIG. 9 will be supplied. As the maximum amplitude of the signal Y is smaller than the threshold Vr, the determination means 31 supplies no signal indicating the presence of metal.

Or if the determination means 31 determines the presence of metal, the contained metal displaying means 34 estimates the approximate magnitude of the contained metal on the basis of the maximum amplitude of the signal Y then and the straight line B, and displays this magnitude on the indicator 36 (S25).

For instance, the ratio αa (=Vy/Vg) between the maximum amplitude Vy of the signal Y and Vg and the ratio αb (=(Vy−Vg/Vg) between the result of subtraction of Vg from the maximum amplitude Vy and Vg are figured out; the maximum diameter da of the contained metal is figured out from the aforementioned formula of the straight line B and the ratio αa; the minimum diameter of the contained metal is figured out from the formula of the straight line B and the ratio αb; and these values are displayed as the magnitude range of the metal contained in the object of inspection 1 on the indicator 36 as shown in FIG. 10 for instance.

By checking this display, the user can intuitively grasp the magnitude of any metallic foreign matter contained in the object of inspection.

To add, though the magnitude range of the contained metal is supposed to be displayed here, the magnitudes of foreign matter samples belonging to the estimated range out of the plurality of foreign matter samples Ms1 through Msn may be displayed as well.

Further, while the foregoing description supposes a case in which the setting means 32 displays only the detectable minimum diameter of metal on the indicator 36 and the threshold matching that minimum diameter is automatically set, a threshold matching a user-designated magnitude can as well be set.

In this case, as shown in FIG. 11, the diameters of foreign matter samples not smaller in diameter than the detectable minimum, out of the foreign matter samples, are displayed on the indicator 36 as detectable magnitudes of metal, and any of those diameters is enabled to be designated by working on the operating unit 35. When a diameter is designated by the user's operation, the maximum (or a slightly smaller value than the maximum would be acceptable) of the detection output of that foreign matter sample in the optimal detection phase is figured out and set as the threshold Vr.

Alternatively, it is also conceivable to display only the minimum detectable diameter of metal, enable any diameter not smaller than the minimum to be designated for input by working on the operating unit 35, figure out the ratio α from the designated diameter and the straight line B, and figure out the product of that ratio and the voltage Vg as the threshold Vr, which is then set.

Where the detectable magnitude metal and the magnitude of metal contained in the object of inspection are to be approximated by only the magnitude of the foreign matter sample as described above, the magnitude to be displayed can be selected from the data of the detection output of the foreign matter sample stored in the memory 33 and the detection output of the object of inspection. In this way, the use of the aforementioned relationship of the straight line B can be dispensed with.

Further, though the foregoing description supposes that each foreign matter sample and the good sample are caused to pass the magnetic field only once to obtain their data, it is also conceivable to cause each sample to pass the magnetic field a plurality of times, average the resultant data, and figure out the optimal detection phase and the relationship between a ratio and the magnitude on the basis of the averaged data.

Further, it is supposed here that the output signal R of the magnetic field variation detecting unit 23 is entered into the orthogonal two-phase type detector unit 26 to obtain the two signals X and Y and figure out the optimal detection phase from the data of the two signals, the present invention can also be applied where the detector unit 26 is of a single-phase type, i.e. configured only of the phase shifter 26a, the mixer 26b and the BPF 26c.

In this case, the data of the waveform (the waveform on the time axis) of the output signal X for the foreign matter samples and the good sample are obtained while varying little by little the phase shift quantity of the phase shifter 26a, and from those data the amplitude variation characteristic Xn (φ) of each foreign matter sample relative to the phase shift quantity Δφ and the amplitude variation characteristic Xg (φ) of the good sample relative to the phase shift quantity φ are figured out as shown in FIG. 12. The phase shift quantity φd that maximizes the ratio β=Vn/Vg of the amplitude Vn of the foreign matter sample to the amplitude Vg of the good sample is determined to be the optimal detection phase θi and, by setting this phase into the phase shifter 26a at the time of inspecting the object of inspection 1, any metal content can be detected with high sensitivity in the same way as described above.

Then, by finding out the relationship between the detection output and the magnitude of metal in that optimal detection phase, it is made possible to display the detectable magnitude of metal and the magnitude of metal contained in the object of inspection in the same way as described above.

Although the foregoing description supposes that foreign matter data Dm on a plurality of foreign matter samples differing in magnitude are not stored in the memory 33, these foreign matter data may as well be stored in the prescribed area 33a of the memory 33 in advance by the manufacturer of the metal detecting apparatus 20 or some other qualified party.

It is also possible to store data on a plurality of foreign matter samples differing in material into the prescribed area 33a of the memory 33 in advance by the processing described above, enable any desired one of the plurality of sets of foreign matter data to be selected in setting the phase for the object of inspection 1, and subject the selected set of foreign matter data to the same processing as described above.

As hitherto described, since the metal detecting apparatus according to the invention is provided with a memory in which the data of a signal supplied from a detector unit when a plurality of foreign matter samples differing in magnitude are caused to pass an alternating field and data representing the magnitudes of foreign matter samples, and determination means causes an indicator to display the detectable magnitude of metal on the basis of the data of those foreign matter samples, the user can intuitively grasp the minimum detectable magnitude of a metallic foreign matter in the object of inspection.

Further, where it is enabled to designate the magnitude of a foreign matter sample by working on the operating unit and set a threshold matching that designated magnitude in the determination means, the user can set the threshold by designating the magnitude itself of metal instead of a voltage or any multiple thereof, and is enabled to achieve threshold setting more intuitively.

Or where metal content display means displays the magnitude of metal contained in the object of inspection, the user can intuitively grasp the magnitude of metal present in the object of inspection, and would find the apparatus far easier to use.

A second preferred embodiment of the present invention will be described below with reference to accompanying drawings.

Since the configuration, actions and advantages of this embodiment are substantially the same as those of the first embodiment except the particular aspects described below, repetition of what was stated with reference to the first embodiment (including reference to drawings) will be avoided wherever practicable, and the same reference signs as those used for the first embodiment will be used as required.

FIG. 13 through FIG. 15 show the overall structure of a metal detecting apparatus 120 to which the invention is applied.

Referring to these drawings, the metal detecting apparatus 120 is configured of a base 121, a conveyor 130 constituting the conveyance route for the object of inspection, a head 140 and a controller 150.

The base 121 is intended to support the conveyor 130 and the head 140, and its lower part is provided with screwed legs 122 to enable the height of the base 121 to be adjusted relative to the installation surface (floor surface). The conveyor 130 has a pair of side plates 131 and 132 formed in a U shape and fixed to the top of the base 121 in a state of being opposite each other.

Between the upper parts of the one-end sides (the left ends in FIG. 13 and FIG. 14) of the two plates 131 and 132, there is rotatably supported a driving roller 133, and a driven roller 134 is rotatably supported between the upper parts of the other-end sides. An endless conveyor belt 135 for carrying the load is stretched between the driving roller 133 and the driven roller 134.

Between the upper parts of the one-end sides and the upper parts of the other-end sides of the side plates 131 and 132, there is fixed an under plate 136 supporting with its upper face the upper part of the conveyor belt 135 running from the driving roller 133 side toward the driven roller 134 side to keep the load horizontal as it is carried. The lower part of the conveyor belt 135 returning from the driven roller 134 side toward the driving roller 133 side is configured to run on a route close to the lower face of this under plate 136. The conveyor belt 135 and the under plate 136 are formed of synthetic resin, which hardly has any influence on the magnetic field.

The driving roller 133 is rotationally driven by a motor 137 integrally disposed toward one of its ends.

The head 140 formed in a rectangular frame shape, longer sideways, is arranged above the middle parts of the side plates 131 and 132. The conveyor belt 135 and the under plate 136 of the conveyor 130 pass a rectangular hole 141, which is longer sideways and is arranged in the upper center part of the head 140.

The inner wall part 141a of the hole 141 in the head 140 is formed all around of synthetic resin plates, which pass magnetic fluxes. Within the head 140, the transmission coil 22 is so wound as to encircle the inner wall part 141a, and the two reception coils 23a and 23b are coaxially wound before and behind the transmission coil 22.

The outer circumference of the head 140 is formed of a magnetic shield material, which does not transmit magnetic fluxes.

Therefore, most of the magnetic fluxes in the magnetic field E generated by the transmission coil 22 pass the inside of the head 140 and within the hole 141, and these magnetic fluxes cross the two reception coils 23a and 23b in substantially equal quantities.

To add, the transmission coil 22 and the two reception coils 23a and 23b are so fixed with an adhesive (not shown) filling the inside of the head 140 that their relative positions do not change.

This head 140, as shown in FIG. 13 through FIG. 15, is fixed over a planar base plate 145, and bolts 123 fixed to the base 121 penetrate the four corners of the base plate 145, and two nuts 124, upper and lower, fastened onto each of the bolts 123 fix the base plate 145.

These bolts 123 and nuts 124 constitute a mechanism to make variable the height of the head 140 relative to the conveyor 130, namely the height of the object of inspection in passing the head 140. The relative height of the object of inspection in passage can be varied by adjusting the height of the nuts 124 relative to each of the bolts 123.

Incidentally, the closest position of the lower part of the conveyor belt 135 passing underneath the under plate 136 of the conveyor 130 to the under face of the hole 141 in the head 140, namely the lowest position of the passing height of the object of inspection relative to the hole 141 is supposed to be the reference position here.

The optical entrance sensor 24 for detecting the timing at which the object of inspection brought onto one end of the conveyor 130 enters into the hole 141 of the head 140 is disposed on the base 121 (or on the side plates 131 and 132 of the conveyor 130 or the head 140 itself). Incidentally, this entrance timing of the object can also be detected from amplitude variations of the output signals X and Y of the detector unit 26, and in this case the entrance sensor 24 can be dispensed with.

The controller 150 disposed above the head 140 has a built-in circuit for driving the motor of the conveyor 130, driving the transmission coil of the head 140, processing signals from the reception coils and performing other functions.

Next will be described actions that take place in this embodiment with reference to FIG. 16 through FIG. 18.

The metal detecting apparatus embodying the invention in this mode is provided with a mechanism capable of adjusting the position of the head 140 relative to the conveyor 130 (the height of the conveyor 130) as stated above. By setting the height of the conveyor 130 to a different level, even if other conditions than the height of the conveyor 130 are the same, the sensitivity of detecting metal contained in the object of inspection may differ.

In this embodiment, in view of this problem, the magnitude of metal detectable by the determination means on the basis of data on foreign matter samples and on a good sample stored in advance is displayed on an indicator in the control procedure described with reference to the first embodiment, or a threshold is set by designating the magnitude of foreign matter samples by working on the operating unit. In this way, not only can the user intuitively grasp the detectable magnitude of metal relative to the object of inspection, but also can the most preferable position (the most sensitive position) of the conveyor 130 be displayed in terms of the detectable magnitude of foreign matter, and thereby made selectable as desired, by varying the height of the conveyor 130 (its relative position to the head 140), figuring out the threshold in each position by repeating the control operation described with reference to the first embodiment, and displaying on the indicator each position and the detectable magnitude of foreign matter matching each position.

As schematically shown in FIG. 16, the position of the conveyor 130 relative to the head 140 is set to a reference position (a), a position (b) raised by a prescribed dimension (e.g. 10 mm) from the reference position (a), and a position (c) further raised by a prescribed dimension (e.g. 15 mm) from the position (b) (accordingly 25 mm above the reference position), and the detectable diameter dr of metallic foreign matter is figured out for each position.

To describe the foregoing procedure with reference to the flow chart of FIG. 17, since steps 101 through S115 in FIG. 17 are the same as steps S1 through S15 for the first embodiment described with reference to FIG. 2, the foregoing description of the first embodiment I (including the pertinent drawings) will be applied to these steps here, and the following description will cover the procedure from S116 onward.

After figuring out from the straight line B the diameter dr of metallic foreign matter matching the reference αr and having it displayed on the indicator 36 as the minimum detectable magnitude of metallic foreign matter detectable by the determination means 31 (S115), this reference αr and the minimum detectable magnitude of metallic foreign matter are stored into the memory 33 (S116). Incidentally, the first procedure so far described is executed in a state in which the conveyor 130 is set in the reference position shown in FIG. 16(a).

Hereupon, an instruction requiring a change in the height of the conveyor 130 is caused to be displayed on the indicator 36 (S117). Receiving this instruction, the operator adjusts the aforementioned mechanism comprising the bolts 123 and the nuts 124 to regulate the height of the head 140 relative to the conveyor 130, and thereby changes the height of the conveyor 130 relative to the head 140. In this case it is changed to and set in the position shown in FIG. 16(b) for instance, and the changed conveyor position is entered from the operating unit.

In this example, the position of the conveyor 130 is changed m times (e.g. changed twice and set to the three positions (a), (b) and (c) shown in FIG. 16), and the operation to figure out the reference ar and the minimum detectable magnitude of metallic foreign matter is repeated for each position. If the required number of repeats is not satisfied, starting with an instruction to pass the good sample (S109), the operation until the storage of vαr and the minimum detectable magnitude of metallic foreign matter (S116) is repeated (if NO at S118).

If the prescribed number m of repeats is satisfied (YES at S118), the reference cr and the minimum detectable magnitude of metallic foreign matter will be displayed on the indicator 36 for each conveyor height (S120).

FIG. 18 shows the final display screen of the indicator 36, wherein the minimum detectable magnitude of (metallic) foreign matter for each of a plurality of different conveyor heights (displayed in terms of the extent of change from the reference position) is displayed, and there is further displayed an instruction requesting to select by moving the cursor, and confirm with the return key, the required conveyor height or magnitude of (metallic) foreign matter.

Receiving this instruction, the operator moves the cursor from the operating unit 35 to select the desired conveyor height and magnitude of (metallic) foreign matter, sets the conveyor height to that level, and can thereby set the selected magnitude of (metallic) foreign matter as the detection sensitivity.

Therefore, it is possible to select the conveyor height which provides the highest detection sensitivity and most suitable for the detection of foreign matter, and accordingly to detect foreign matter with high sensitivity. Or it is also possible to select a practically needed level, not necessarily the highest, of detection sensitivity and a matching conveyor height, and achieve the required level of detection sensitivity by setting the conveyor position to that height.

In this example, as shown in FIG. 18, the detectable magnitude of (metallic) foreign matter is displayed for each of the three heights, with the highest detection sensitivity being achieved in the middle position shown in FIG. 16(b). Thus, the detection sensitivity was found at its peak when the conveyor 130 was in an intermediate position at a suitable distance from the reference position (FIG. 16(b)) rather than the reference position closest to the head 140 (FIG. 16(a)) or a position considerably away from the reference position (FIG. 16(c)).

However, this trend is but one example, and the optimal position (the position of the highest sensitivity) of the conveyor 130 relative to the head 140 may vary with specific configurational features, such as the positions of the transmission coil 122 and the two reception coils 123 and 123b relative to the head 140.

However, if the configuration is basically the same as that of this embodiment, detection sensitivity levels can be displayed for a plurality of positions of the conveyor 130 to permit selection, there can be no difference in the advantage of making possible effective detection of foreign matter by always selecting the optimal conveyor height for the detection of foreign matter irrespective of any mechanical variation regarding the conveyor 130 and the head 140.

Although in this embodiment the conveyor height is manually changed with the elevating mechanism of the head 140, it also conceivable to change this height with a power-driven elevating mechanism through working on the operating unit 35 and to enter the set conveyor height automatically into the control unit 30. In a conceivable configuration for such a case, if a desired conveyor height is selected on the final screen, the conveyor height can be automatically set to that desired level under the control of the control unit 30.

While in this embodiment the head 140 is moved up or down to alter the relative height (position) of the conveyor 130 to the head 140, conversely, the conveyor 130 can be moved up or down relative to a fixed e head 140.

Further in this embodiment, the position of the conveyor 130 is successively raised from the reference position stepwise and measurement is repeated, but of course the position of the conveyor 130 set in advance of measurement can be selected in any sequence. For instance, it can be in a sequence from the highest position to the reference position and then to the lowest position.

In the two preferred embodiments of the present invention described so far, a plurality of foreign matter samples are caused to pass the alternating field to acquire foreign matter data for each metal detecting apparatus, and stored into the memory 33 of each apparatus solely for that apparatus. However, the acquisition of such foreign matter sample data can as well be left to one specific metal detecting apparatus, which is to serve as the master apparatus, only once in principle, and these data can be transplanted to many other metal detecting apparatuses as master data for their individual use.

In that case, each of the other metal detecting apparatuses can have the master data stored in a memory, acquire data by causing the plurality of foreign matter samples used for the acquisition of master data to pass its own alternating field, and correct the transplanted master data with those newly acquired data. This configuration would enable the mater apparatus to collectively generate data on foreign matter samples to be stored in the memory and, moreover, since each metal detecting apparatus correct the master data, subtle differences of individual apparatuses can be properly addressed.

The invention claimed is:

1. A metal detecting apparatus comprising:
a signal generator,
a transmission coil which receives a signal supplied from said signal generator and causes an alternating field of a frequency equal to a frequency of the signal on a conveyance route of an object of inspection, a magnetic field variation detecting unit which includes two reception coils arranged along the conveyance route in positions to receive said alternating field, and supplies a signal matching a variation in a magnetic field due to the object passing said alternating field, a detector unit which subjects an output signal of said magnetic field variation detecting unit to synchronous detection with a signal of a frequency equal to a signal supplied from said signal generator, determination means which compares an output signal of said detector unit and a threshold to determine presence or absence of any metal contained in the object of inspection, an indicator, and a memory which stores in advance data of signals supplied by said detector unit when a plurality of metallic foreign matter samples differing in magnitude pass said alternating field and data representing magnitude of each foreign matter sample, wherein said determination means displays the detectable magnitude of metal corresponding to the threshold on said indicator on a basis of data on the foreign matter samples stored in said memory.

2. The metal detecting apparatus according to claim 1, further comprising:

an operating unit, wherein the magnitude of the foreign matter sample can be designated by the operating unit, and a threshold matching the designated magnitude is set into said determination means.

3. The metal detecting apparatus according to claim 1, wherein data of signals supplied from said detector unit when each of a plurality of metallic foreign matter samples differing in magnitude is caused to pass said alternating field of said metal detecting apparatus are acquired as master data, and wherein the master data are caused to be stored in said memories of other metal detecting apparatuses, each of said plurality of foreign matter samples is caused to pass the alternating field of said other metal detecting apparatuses, and the master data are corrected with the data of signals supplied from the detector unit.

4. A metal detecting apparatus comprising:

a signal generator, a transmission coil which receives a signal supplied from said signal generator and causes an alternating field of a frequency equal to a frequency of the signal on a conveyance, route of an object of inspection, a magnetic field variation detecting unit which includes two reception coils arranged along the conveyance route in positions to receive said alternating field, and supplies a signal matching a variation in said magnetic field due to the object passing the alternating field, a detector unit which subjects an output signal of said magnetic field variation detecting unit to synchronous detection with a signal of a frequency equal to a signal supplied from said signal generator, determination means which compares an output signal of said detector unit and a threshold to determine presence or absence of any metal contained in the object of inspection, an indicator, a memory which stores in advance data of signals supplied by said detector unit when a plurality of metallic foreign matter samples differing in magnitude pass said alternating field and data representing magnitude of each foreign matter sample, and contained metal displaying means which, when said determination means determines the presence of metal in the object of inspection, determines a magnitude of the metal contained in the object of inspection, corresponding to the signal of the detector unit, on a basis of a signal supplied from said detector unit with respect to the object of inspection and data on the foreign matter samples stored in said memory, and displays the magnitude on said indicator.

5. A metal detecting apparatus comprising:

a signal generator, a transmission coil which receives a signal supplied from said signal generator and causes an alternating field of a frequency equal to a frequency of the signal on a conveyance route of an object of inspection, a magnetic field variation detecting unit which includes two reception coils arranged along the conveyance route in positions to receive said alternating field, and supplies a signal matching a variation in said magnetic field due to the object passing the alternating field, a detector unit which subjects an output signal of said magnetic field variation detecting unit to synchronous detection with a signal of a frequency equal to a signal supplied from said signal generator, determination means which compares an output signal of said detector unit and a threshold to determine presence or absence of any metal contained in the object of inspection, an indicator, a memory which stores data of signals supplied by said detector unit when a plurality of metallic foreign matter samples differing in magnitude pass the alternating field and data representing magnitude of each foreign matter sample, and stores data of signals supplied from the detector unit when a good sample is caused to pass the alternating field, and setting means for setting an optimal detection phase in which an output ratio between foreign matter samples and the good sample is maximized on a basis of the data on foreign matter samples and data on the good sample stored in said memory, wherein a relationship between a detection output ratio between the good sample and each foreign matter sample in the optimal detection phase is determined, and said threshold matching a reference level of said ratio is set.

6. The metal detecting apparatus according to claim 5, wherein the positions of the conveyance route relative to said alternating field can be altered, and wherein the good sample is caused to pass said alternating field in the plurality of different positions set by alteration to figure out said threshold for each position, and each position and the magnitude of foreign matter detectable according to each threshold in each position are caused to be displayed on an indicator.

* * * * *